(12) United States Patent
Sanpei et al.

(10) Patent No.: US 6,385,004 B1
(45) Date of Patent: May 7, 2002

(54) RECORDING AND/OR REPRODUCTION SYSTEM FOR RECORDING MEDIUM

(75) Inventors: Takaaki Sanpei; Mitsue Sakurai, both of Miyagi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/358,928

(22) Filed: Jul. 23, 1999

(30) Foreign Application Priority Data

Jul. 29, 1998 (JP) .......................................... 10-214298

(51) Int. Cl.[7] .......................... G11B 15/00; G11B 23/02
(52) U.S. Cl. ...................................... 360/96.5; 360/132
(58) Field of Search .............................. 360/96.5, 96.6, 360/132, 133

(56) References Cited

U.S. PATENT DOCUMENTS

| | | | | |
|---|---|---|---|---|
| 5,845,195 A | * | 12/1998 | Miodownik et al. | ........ 360/133 |
| 5,878,282 A | * | 3/1999 | Mital | ........................ 360/133 |
| 5,986,992 A | * | 11/1999 | Bardmesser | ................ 360/133 |
| 5,995,344 A | * | 11/1999 | Fukuda et al. | .............. 360/133 |

* cited by examiner

*Primary Examiner*—Allen T. Cao
(74) *Attorney, Agent, or Firm*—Jay H. Maioli

(57) ABSTRACT

A cassette accommodating a recording medium is loaded in a recording and/or reproduction system, and includes a separate internal memory 4 shortening the time required for searching for required information of the recording medium. An IC board (27) constituting a storage element unit is fixedly built on the upper surface side of an upper half portion (43) of a tape cassette (41) housing a recording medium, and the output terminals (29) of the IC board (27) are exposed on the outer surface side of the upper half portion (43). An information detecting unit (51) is fixed on the upper surface portion (76*b*) of the cassette holder (76) of the recording and/or reproduction system (61), and the terminal portions (54) of the detection external terminal (53) thereof are protruded inward of the upper surface portion (76*b*) of the cassette holder (76) and thus brought into contact and connected with the output terminals (29) of the IC board (27) of the tape cassette (41) inserted in the cassette holder.

6 Claims, 20 Drawing Sheets

RECORDING AND/OR REPRODUCTION SYSTEM FOR RECORDING MEDIUM

BACKGROUND OF THE INVENTION

1. Field of the Invention

The present invention relates to a recording and/or reproduction system for recording in and reproducing from a recording medium such as a tape cassette or the like used with a digital audio tape recorder (DAT) and a digital data storage (DDS).

2. Description of the Related Art

In recent years, with the progress of multiplication and reduction in size and weight of the recording and reproduction equipment such as AV equipment, a computer equipment and the like, a tape cassette for a magnetic tape constituting a compact magnetic recording medium of high recording density such as a digital audio tape cassette (DAT cassette) or the like has been developed. The magnetic tape cassette constituting a cassette for accommodating such a magnetic recording medium has been developed as a magnetic recording medium for the AV equipment. Taking advantage of the high recording density thereof, however, it has come to be used also as an external recording medium for a digital data storage for the computer equipment.

This conventional tape cassette for the digital audio tape (DAT) includes a cassette body for accommodating a magnetic tape and having an enclosing member for opening and closing a required opening. Specifically, the conventional tape cassette is configured as shown in FIGS. 1 to 3A, 3B. FIG. 1 is an exploded view of a tape cassette, FIG. 2 shows the appearance of the tape cassette, and FIGS. 3A, 3B the manner in which the tape cassette is in use and not in use.

In FIGS. 1 to 3A, 3B, reference numeral 1 designates the whole of the tape cassette. A cassette body 2 of this tape cassette 1 is formed in a box shape combining an upper half portion 3 and a lower half portion 4 with screws or by melt-welding. A magnetic tape T is accommodated in this cassette body 2. A bottom portion 4a of the lower half portion 4 constituting this cassette body 2 is formed with a pair of right and left reel shaft insertion holes 5, 5. A pair of reel hubs 6, 6 wound with the magnetic tape T are rotatably accommodated above the reel shaft insertion holes 5, 5. The magnetic tape T wound on the reel hubs 6, 6 is held by upper and lower smooth or sliding sheets 7, 7, disposed on the bottom portion 4a of the lower half portion 4 and led and exposed to the front side of the cassette body 2 through right and left tape guides 8, 8 arranged on both sides of the right and left front sides of the lower half portion 4.

Also, the front portion of the lower half portion 4 is formed with a recessed loading pocket 9 at a portion corresponding to the reverse side of the magnetic tape T exposed to the front side of the cassette body 2, i.e. between the tape guides 8, 8. When the tape cassette 1 is loaded in a magnetic recording and/or reproduction system, a tape loading guide member of the system advances into the pocket 9 and thereby pulls out the magnetic tape T forward of the cassette body 2 (for tape loading).

On the other hand, the upper half portion 3 is formed with a transparent window portion 10, through which the amount of the magnetic tape T wound on the reel hubs 6, 6 can be checked. The forward end portion of the upper half portion 3 has mounted thereon a front lid 11 vertically rotatable about side plates 11b, 11b formed at the ends of a main plate 11a for opening or closing the magnetic tape exposure portion on the front side of the cassette body 2. While the tape cassette 1 is out of use, the magnetic tape exposure portion is enclosed between the tape guides 8, 8 on the front side of the cassette body 2 by the front lid 11. Also, when the tape cassette 1 is loaded in the magnetic recording and/or reproduction system, the mechanism in the system rotates and opens upward the front lid 11 thereby to expose the magnetic tape T. With the opening motion of the front lid 11, a lock member 12 for stopping the rotation of the reel hubs 6, 6 is released.

In this tape cassette 1, a slider 13 constituting a member for closing the opening is longitudinally slidably mounted on the lower surface of the bottom surface portion 4a of the lower half portion 4 of the cassette body 2. This slider 13 is formed with reel shaft insertion holes 14, 14 corresponding to the reel shaft insertion holes 5, 5 of the lower half portion 4. The slider 13 is always biased forward by a spring 15. When the tape cassette 1 is not used, the slider 13 is located at the forward closing position thereby to close the reel shaft insertion holes 5, 5 and the pocket 9 on the lower half portion 4 constituting a required opening of the cassette body 2. Also, when the tape cassette 1 is loaded in the magnetic recording and/or reproduction system, the mechanism in the system slides the slider 13 to the rear opening position, whereby the reel shaft insertion holes 14, 14 are matched with the reel shaft insertion holes 5, 5 of the lower half portion 4 thereby to reveal the reel shaft insertion holes 5, 5 and the pocket 9.

In this way, the tape cassette 1 is such that, when not used, the front lid 11 and the slider 13 are in a closing position for the cassette body 2 as shown in FIG. 2 and FIG. 3A, so that the front opening of the cassette body 2, the reel shaft insertion holes 5, 5 and the pocket 9 are closed. Thus the interior of the cassette body 2 is hermetically sealed, so that the magnetic tape T accommodated therein is protected without any dust or the like attached thereto.

Also, the recording and reproduction tape cassette is reduced in size, while at the same time having the functions including anti-erasure means for preventing the erasure of the recorded information and determining the length of the magnetic tape, in addition to the recording/reproduction in and from a recording/reproduction tape such as the magnetic tape. In a recording and reproduction tape cassette such as a digital video tape cassette or the like, for example, an integrated circuit board (hereinafter referred to as the IC board) constituting a storage unit with the connection terminal portion thereof facing a predetermined position of the upper and lower half portions of the cassette is built in the recording and reproduction tape cassette. The contact terminal of this IC board is connected to the external terminal of the information detecting unit included in the magnetic recording and/or reproduction system so that the recorded information of the accommodation tape stored in the IC memory of the IC board can be searched for.

The recording and reproduction tape cassette having an IC board built therein as a storage unit in this way and the IC board are shown in FIGS. 4 to 7A, 7B. FIG. 4 shows the lower half portion of the recording and reproduction tape cassette, FIG. 5 shows the IC board and FIG. 6 is a sectional view of the IC board.

This recording and reproduction tape cassette 20, as shown in FIG. 4, comprises a board mounting unit 22 including a thin, long area, i.e. a gap portion of a predetermined width parallel to the rear surface at a predetermined position such as a corner of the rear side of the rectangular lower half portion of the cassette body. The rear surface of this board mounting unit 22 is formed with a plurality of connection windows 23 so that the connection terminal of the IC board described later faces the rear portion of the tape cassette 20.

Also, a bottom portion 21a of the lower half portion 21 is formed with reel shaft insertion holes 24, 24, and formed with tape guides 25, 25 on the two sides of the front thereof. A recessed loading pocket portion 26 is formed between the tape guides 25, 25.

An IC board 27 configured as shown in FIGS. 5 and 6 is built in the board mounting portion 22 of the lower half portion 21. A board portion 27a of the IC board 27 is made of epoxy resin or other engineering plastics (POM, etc.) equivalent to the plastic material of the upper and lower half portions of the cassette body formed of plastics such as ABS resin or the like. An IC chip 28 constituting a storage element is practically mounted on the inner surface of the upper half portion of the board portion 27a of the IC board 27 and covered with a protective layer 27b. At the same time, an output terminal 29 is arranged on the outer surface of the lower half portion.

The IC board 27 having the IC chip 28 configured this way is built in the board mounting portion 22 of the lower half portion 21 of the tape cassette 20 described above, as shown in FIG. 7A, in such a manner that the connection terminal 29 is directed outward and the board 27a is forced from above into engagement with grooves 22a, 22b on the two sides of the board mounting portion 22. Once the IC board is built in the board mounting portion 22 of the lower half portion 21 in this way, as shown in FIG. 7B, the connection terminal 29 comes to face the rear portion through the connection window 23.

With the IC board 27 built in the lower half portion 21 in this way, the upper half portion (not shown) is covered from above and assembled. Specifically, the IC board 27 with the upper and lower ends of the board portion 27a thereof held between the upper and lower half portions is fixedly built in the cassette body so that the connection terminal 29 comes to face the rear surface of the tape cassette 20.

For producing the recording information of the recording and reproduction tape cassette 20 having this configuration, as shown in FIG. 8A, the tape cassette 20 loaded in a magnetic recording and/or reproduction system 30 is inserted and held in a cassette holder 31 as a cassette insertion and holding unit of the system 30. After being slid inward, the tape cassette 20 is moved downward and set in a cassette mounting portion 33 including a drive mechanism 32. Under this condition, the output terminal 29 of the IC board 27 of the tape cassette 20 is brought into contact, through the connection window 23, with a detection external terminal (hereinafter referred to as the information detection terminal) 34 of the information detecting unit included in the cassette mounting portion 33 in the system 30. As a result, the information of the accommodated magnetic tape stored in the storage element 28 of the IC board 27, i.e. the information such as addresses are searched for.

The digital audio tape recorder (DAT recorder) and the digital data storage (DDS) described above, however, have no information detecting unit mounted thereon. Therefore, no IC board is built in the tape cassette used for the DAT recorder or the like. As a result, in searching for an address of the accommodated magnetic tape, for example, the address is written in a part of the magnetic tape. In recording or reproducing data, therefore, a vacant address is searched for, and then with the address of the required data searched for, the data is read or written, thus consuming a considerable length of time for the search.

Also, since the address search area is located at the forward end of the magnetic tape, the magnetic tape is configured to be always rewound after reading the required data. Thus, the head is contacted an increased number of times and easily damaged, thereby shortening the endurance (service life) of the magnetic tape or the like.

In the recording and reproduction tape cassette having the IC board built in and mounted thereon as an information storage unit, the output terminal of the IC board faces the rear surface of the tape cassette and comes into contact with the information detecting terminal included in the cassette mounting portion of the magnetic recording and/or reproduction system for reading the information. For reading the required information from the tape cassette, the tape cassette, after being inserted in the recording and reproduction system, is slid inward and moved further downward, so that the information is read out with the tape cassette mounted on the cassette mounting portion. This series of operations consumes a considerable time for search. Also, for a tape cassette different from the desired one, the operation reverse to the one described above is performed, i.e. the tape cassette is unloaded to exchange with the desired tape cassette. This requires additional labor. With the tape cassette mounted in the cassette mounting portion, the tape is led out, resulting in an increased number of tape reel-out steps thereby leading to the problem of the endurance of the tape being affected and so on.

SUMMARY OF THE INVENTION

The present invention has been developed in view of the points described above, and an object thereof is to provide a recording and/or reproduction system for a recording medium in which an IC board constituting a recording unit is built in a digital audio tape cassette (DAT cassette) or the like recording medium accommodating cassette, and by inserting the cassette into the recording and/or reproduction system, the information stored in the IC board can be instantaneously read out thereby making it possible to shorten the time required for searching the information in the recording medium and improving the durability of the recording medium.

In order to achieve the object described above, according to the present invention, there is provided a recording and/or reproduction system for a recording medium, in which a recording medium accommodating cassette containing a recording medium therein is inserted in a predetermined direction in a cassette insertion and holding portion of the recording and/or reproduction system, and after being inserted, moved to and mounted in a cassette mounting position for recording in and/or reproducing from a recording medium, wherein the cassette includes a storage element unit for storing the required information of the recording medium, wherein the output terminal of the storage element unit is exposed on the outer surface of the cassette, wherein an information detecting terminal of the information detecting unit corresponding to the output terminal of the storage element unit on the cassette side is arranged on the inner surface side of the cassette insertion and holding portion, and wherein the information can be read from the storage element unit before the cassette is moved to the cassette mounting position.

In the configuration described above, the output terminal of the storage element unit is exposed on the surface pressed by the pressure spring of the cassette. The information detecting terminal has a required elasticity and the cassette insertion and holding portion is configured to also serve as the pressure spring member.

In the configuration described above, the information detecting terminal is preferably set to the spring pressure of about 50 to 100 g.

Also, in the configuration described above, a connection window corresponding to each information detecting terminal is formed in the cassette, and the storage element unit is fixed by a fixing means on the inner surface side of the cassette so that the output terminal preferably faces the connection window from the inner surface side thereof.

In the configuration described above, the fixing means includes a recess for storing the storage element unit and an engaging protrusion protruded from the peripheral edge portion of the recess, and a connection window is preferably formed in the recess.

Further, in the configuration described above, the cassette includes a slider formed on the lower surface side being sudable in the longitudinal direction for opening and closing the required opening, and a connection window corresponding to the information detecting terminal is formed in the slider, and the storage element unit is fixed on the inner surface by the fixing means so that the output terminal preferably faces the connection window from the inner surface side.

In the configuration described above, the fixing means on the inner surface side of the slider is preferably formed with a recess for accommodating the storage element unit, and an engaging protrusion from the peripheral edge portion of the recess, wherein a connection window corresponding to each information detecting terminal is preferably formed in the recess.

In the recording medium accommodation cassette and the recording and/or reproduction system thereof according to the present invention configured as described above, the recording medium accommodating cassette is inserted in the cassette insertion and holding portion of the recording and reproduction system, so that the information detecting terminal of the information detecting unit of the recording and/or reproduction system is brought into pressure contact with the output terminal of the storage element unit mounted on the cassette. In this way, the search for the information of the accommodated recording medium is carried out before the cassette moves to the cassette mounting position thereby to shorten the search time or the like considerably.

Also, the information detecting terminal can also serve as the pressure spring member, and therefore the number of component parts can be reduced for a reduced cost.

Further, the storage element unit is connected to the information detecting terminal on the upper surface side where pressure is applied by the cassette mounting spring or on the slider side, i.e. the lower surface side of the cassette. In this way, the cassette with the storage element unit and the recording and/or reproduction system thereof can be designed without changing the position of the recording medium accommodating cassette, the member for preventing the erroneous erasure of the recording and/or reproduction system, the member for identifying the type of the recording medium and so on, thereby contributing to an increased design freedom.

BRIEF DESCRIPTION OF THE DRAWINGS

FIGS. 3A, 3B are a perspective views of the lower surface side of the tape cassette shown in FIGS. 1 and 2, in which FIG. 3A shows the case out of use and FIG. 3B the case in use;

FIGS. 7A, 7B are a diagrams for explaining the process of building the IC board of FIG. 5 in the lower half portion of FIG. 4, in which FIG. 7A shows the state before the IC board is built in and FIG. 7B the state with the IC board built in;

FIGS. 8A, 8B are a diagrams for explaining the process of mounting in a recording and/or reproduction system the conventional tape cassette with the IC board built therein, in which FIG. 8A shows the state in which the tape cassette is inserted in the cassette holder and FIG. 8B the state in which the tape cassette is moved to and mounted at the cassette mounting position.

DETAILED DESCRIPTION OF THE PREFERRED EMBODIMENTS

Now, embodiments of the present invention will be explained with reference to FIGS. 9 to 27.

In the embodiments, the recording medium accommodating cassette is configured as a tape cassette for accommodating therein a magnetic tape constituting a recording medium hermetically, and a storage element unit for storing the required information is built in the tape cassette, so that a recording and/or reproduction system for recording in and reproducing from the tape cassette is configured to permit the search of the information stored in the storage element unit.

Figure 1:
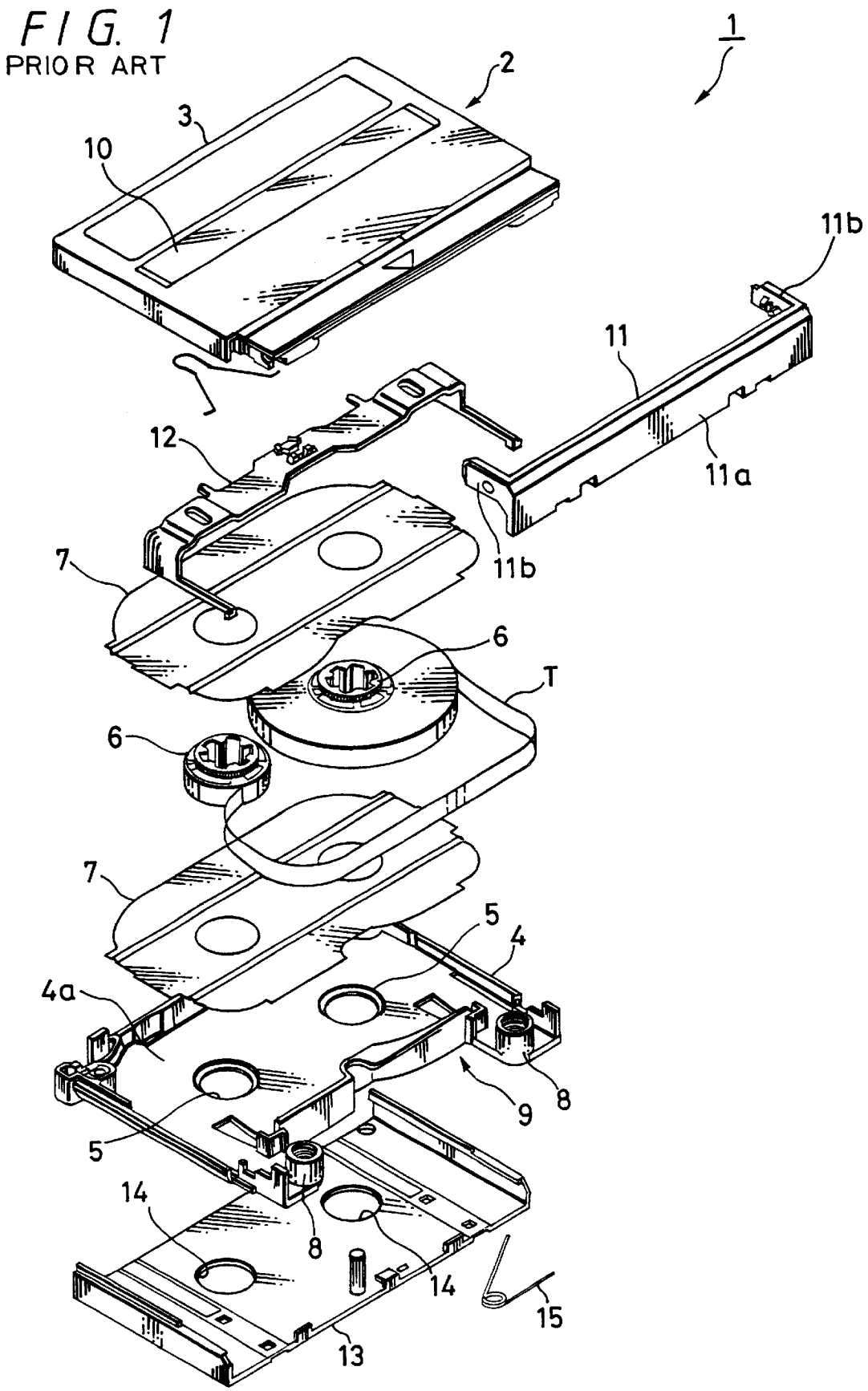
FIG. 1 is an exploded perspective view of the conventional DAT cassette.
Figure 2:
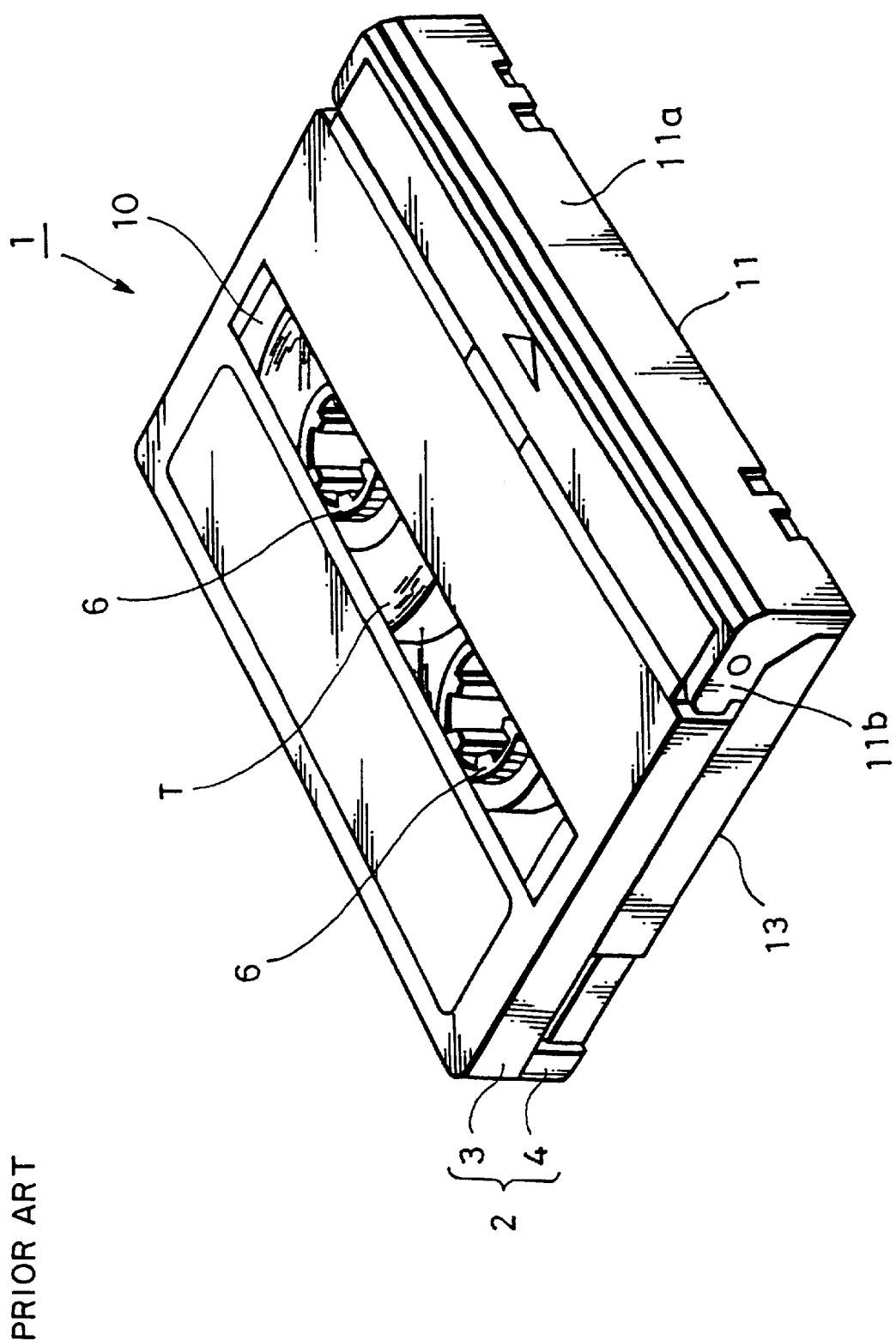
FIG. 2 is a perspective view of the appearance of the tape cassette shown in FIG. 1.
Figure 3A:
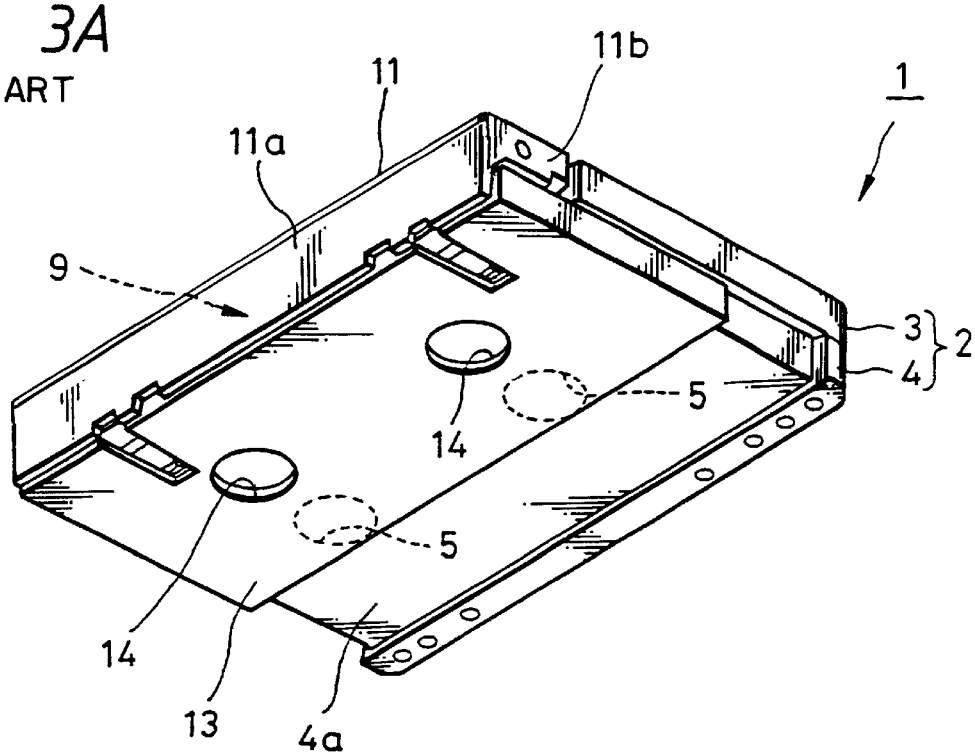
Figure 3B:
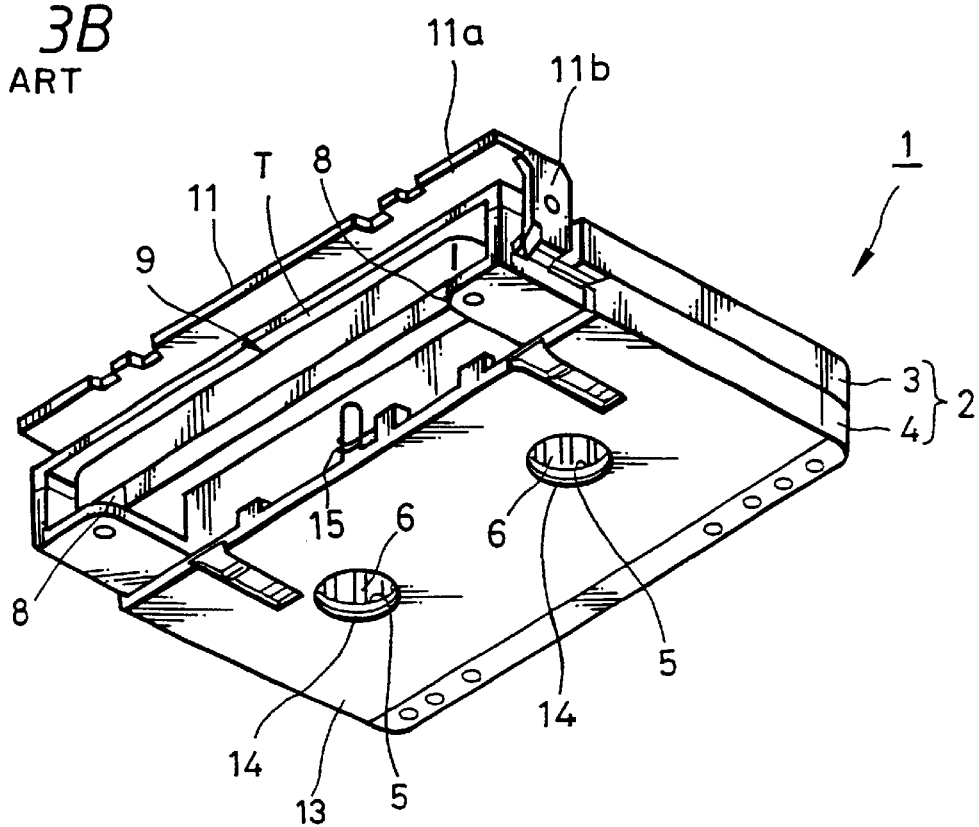
Figure 4:
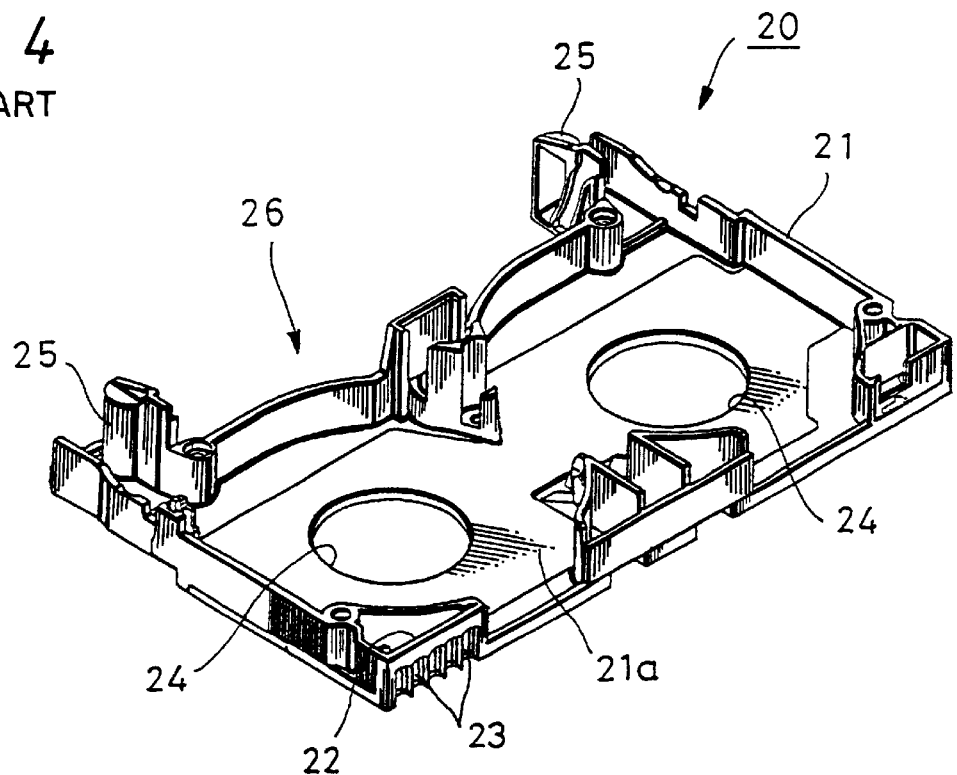
FIG. 4 is a perspective view of the lower half portion of another conventional tape cassette.
Figure 9:
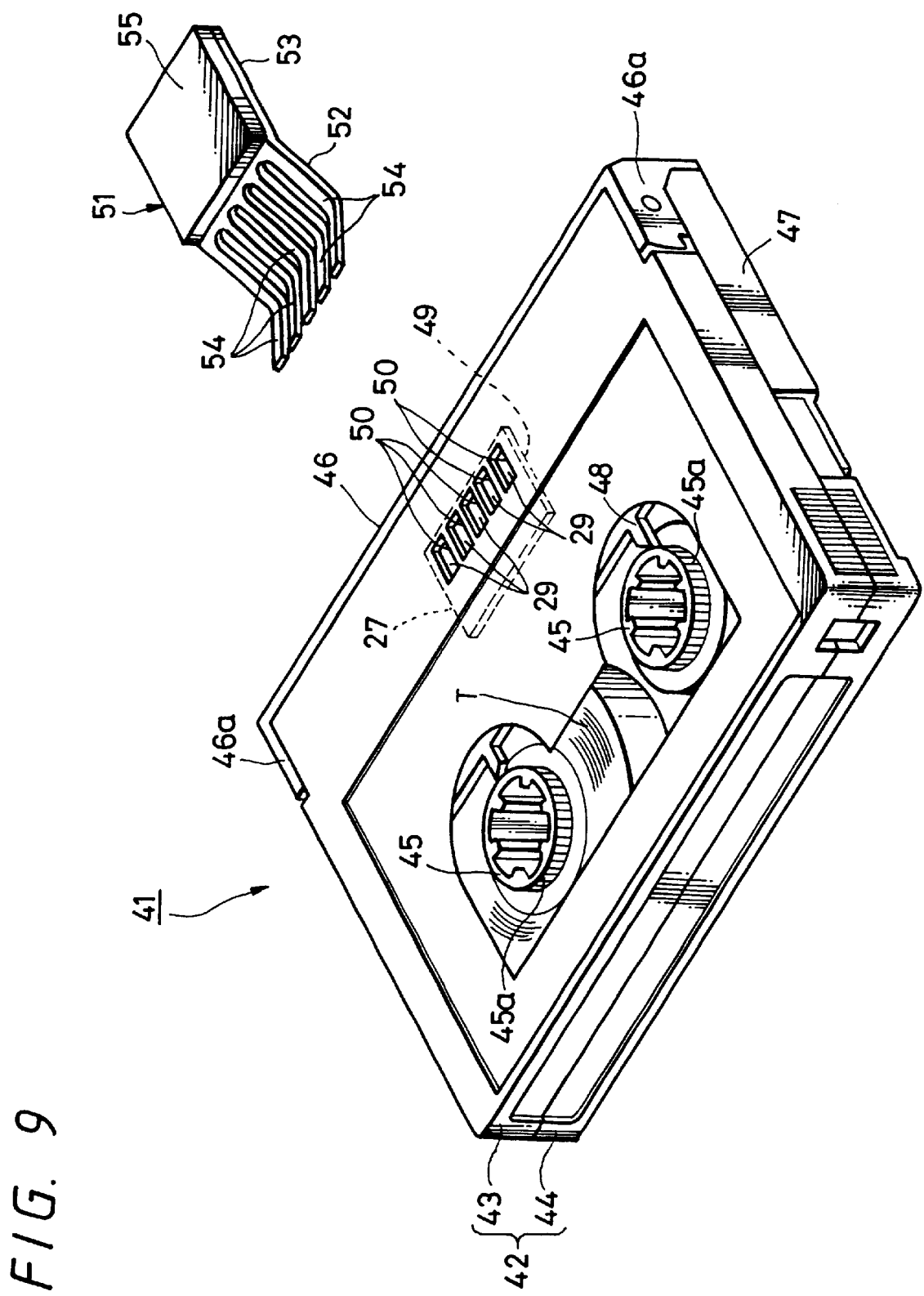
FIG. 9 is a perspective view of a tape cassette and an information detecting unit according to an example to which the invention is applied.
Figure 10:
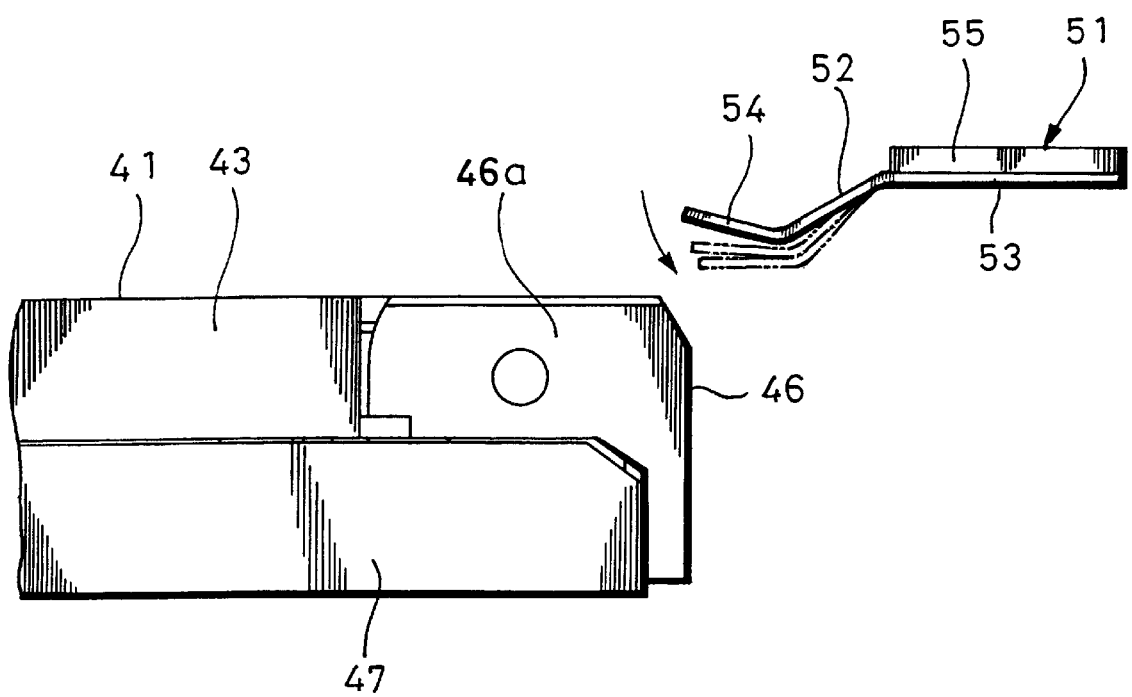
FIG. 10 is a side view, partly not shown, showing the relation between the tape cassette of FIG. 9 and the information detecting unit.

First, a first embodiment will be explained with reference to FIGS. 9 to 15. A tape cassette 41 according to this embodiment, as shown in FIGS. 9 and 10, has substantially the same configuration as the tape cassette shown in FIGS. 1 to 3. A cassette body 42 is formed in box shape by combining the upper half portion 43 and a lower half portion 44 with screws, by fusion or the like. The cassette body 42 has accommodated therein a magnetic tape T wound on a pair of reel hubs 45, 45.

The front portion of the cassette body 42, like the tape cassette described above is formed with a loading pocket in an area from the front surface side to the lower surface side. A front lid 46 for opening and closing the front side of the pocket portion is mounted in such a manner as to open upward on both side surfaces 46a, 46a. Also, the lower surface side, i.e. the lower surface side of the lower half portion 44 has mounted thereon a slider 47 longitudinally slidably as a member for closing the opening, thereby opening and closing the lower surface sides of the loading pocket and the reel shaft insertion hole of the lower half portion 44. The front lid 46, as a result of the upward opening operation, comes to engage engaging teeth members 45a, 45a formed on the reel hubs 45, 45 in the cassette body 42 thereby to unlock a lock member 48 for stopping the reel hubs 45, 45. Also, a reel shaft insertion hole corresponding to the reel shaft insertion hole of the lower half portion 44 is formed in the slider 47. At the rear sliding position (open position) of the slider 47, the reel shaft insertion hole is overlapped with the reel shaft insertion hole of the lower half portion 44, and thereby opened to the exterior. At the same time, the loading pocket portion is opened.

As described above, in the case where the tape cassette 41 according to this embodiment, is located at a position where the front lid 46 and the slider 47 are closed for the cassette body 42, the loading pocket portion constituting the front open portion and the reel shaft insertion hole of the lower half portion 44 are closed so that the interior of the cassette body 42 is hermetically sealed. Then, no dust or the like attaches to the magnetic tape T accommodated, and the reel hubs 45, 45 are locked and protected by the lock member 48 without loosening to an unnecessary degree.

Figure 5:
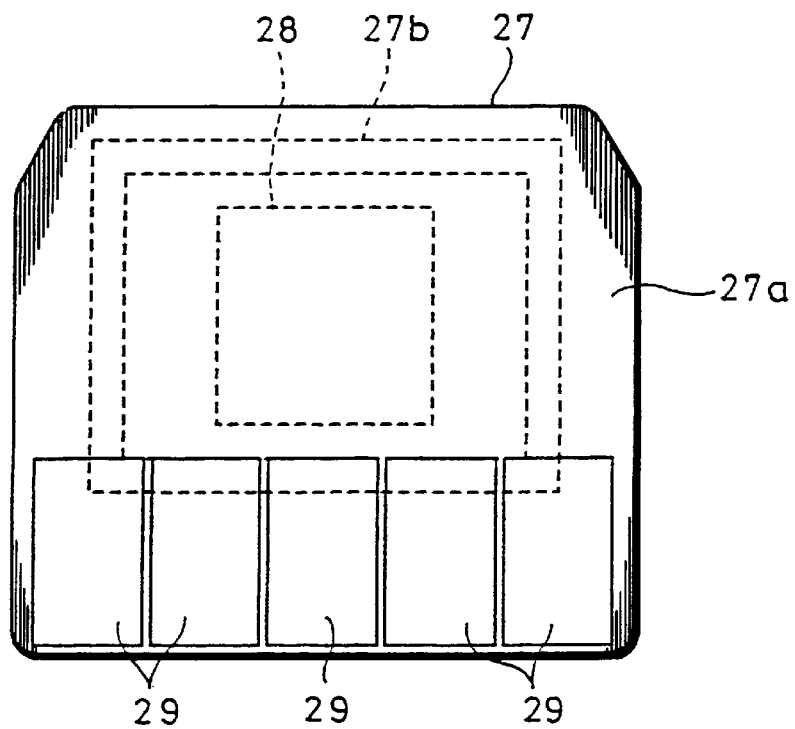
FIG. 5 is a plan view of the IC board built in the tape cassette shown in FIG. 4.
Figure 6:
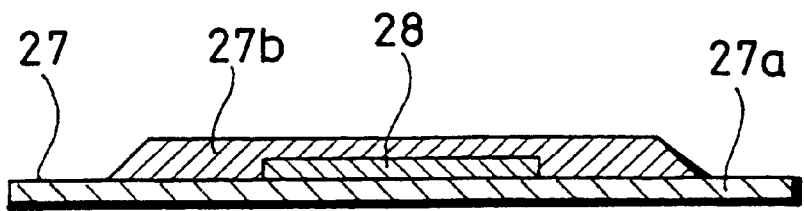
FIG. 6 is a cross sectional view of the IC board shown in FIG. 5.
Figure 7A:
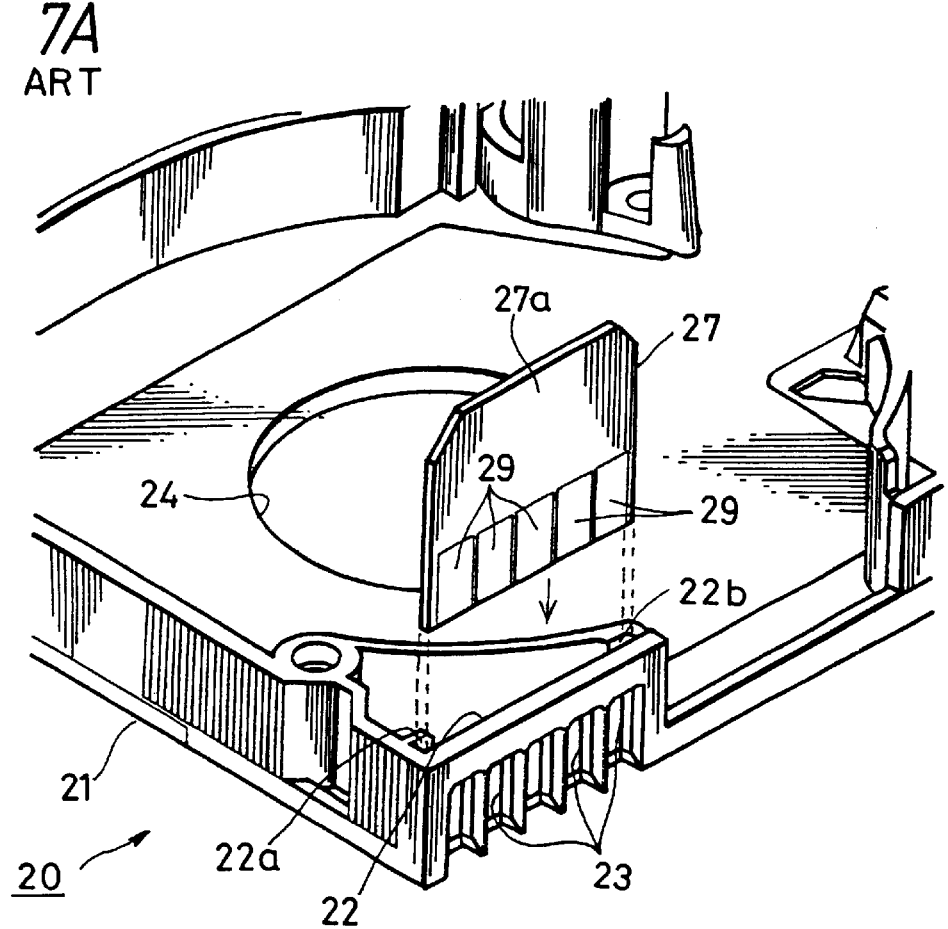
Figure 7B:
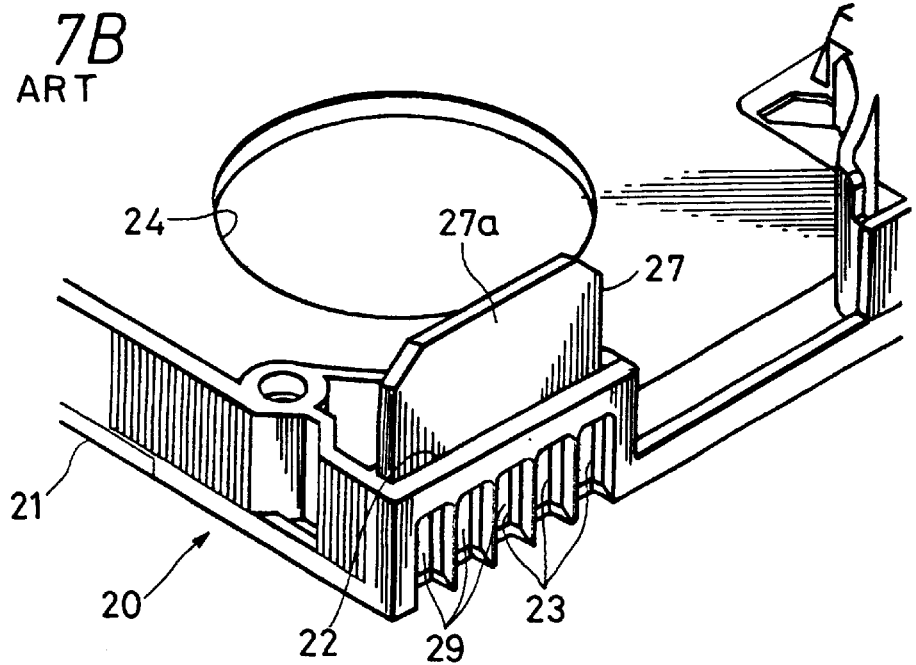
Figure 8A:
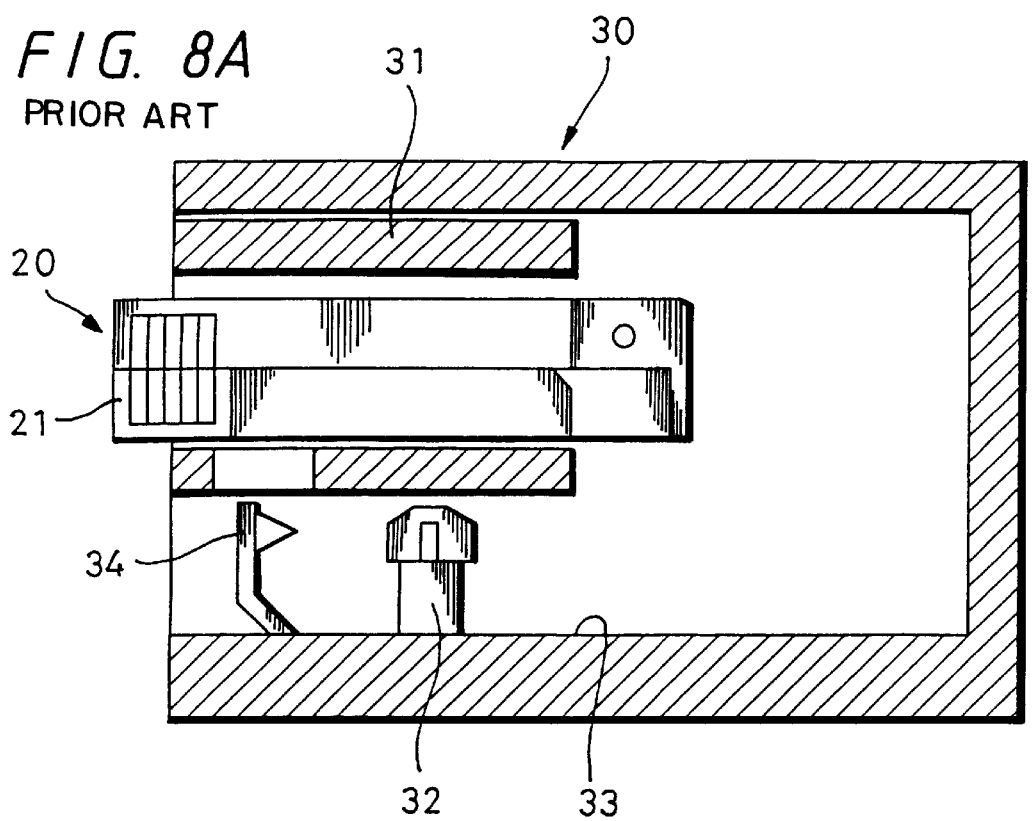
Figure 8B:
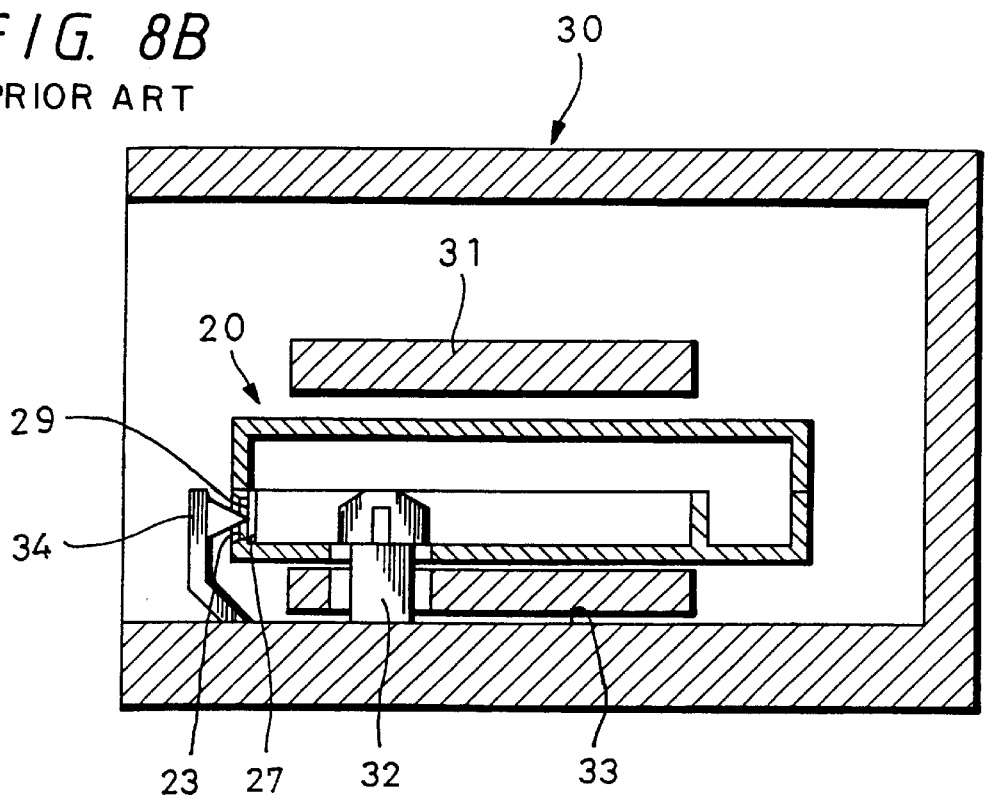

The cassette tape 41 according to this embodiment has built therein an integrated circuit board (hereinafter referred to as the IC board) as a storage element unit connected to the detection external terminal of the information detecting unit described later included in the recording and/or reproduction system and permitting the search for the recording information of the accommodated magnetic tape T. This IC board is configured in the same manner as the IC board 27 configured as shown in FIGS. 5 and 6. Therefore, the same component elements will be designated by the same reference numerals, respectively, and will not be described in detail.

Figure 11:
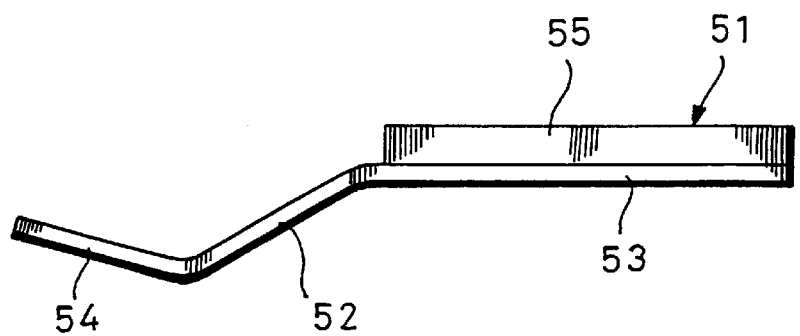
FIG. 11 is a side view of the information detecting unit.

Specifically, the information detecting unit 51 has a detection external terminal 52 formed of a conductive material such as brass, Fe brass, bronze phosphate, copper beryllium, German silver or the like for the spring having the required elasticity. As shown in FIGS. 9 and 11, a plurality of terminal portions 54 in the same number as the output terminals 29 of the IC board 27 described above, for example, are formed on a board 53 substantially in the shape of angle in a manner elastically bent and extended, and an IC memory read chip 55 is mounted on the board 53. The elasticity, i.e. the spring pressure of the terminal portion 54 of the detection external terminal 52 is set to about 50 to 100 g substantially equal to the spring pressure of the cassette holding spring.

In other words, a portion 49 for fixedly building in the IC board is formed in the inner surface side at the front central portion of the upper half portion 43 of the tape cassette 41. A plurality of window holes 50, through which the output terminals face the outside, located in the front portion of the fixing portion 49 are protruded on the front surface side. The IC board 27 is fixedly built in the fixing portion 49, and the output terminals 29 thereof corresponding to the window holes 50 face on the front surface.

This tape cassette 41 is inserted into the recording and/or reproduction system described later, for example, whereby the information detecting terminal 52 of the information detecting unit 51 shown in FIGS. 9 to 11 and built in the recording and/or reproduction system and the output terminals 29 of the IC board 27 are connected through the window holes 50.

Now, a recording and/or reproduction system for performing the recording and reproducing operation using the tape cassette 41 configured as described above will be explained with reference to an embodiment shown in FIGS. 12 to 15.

Figure 12:
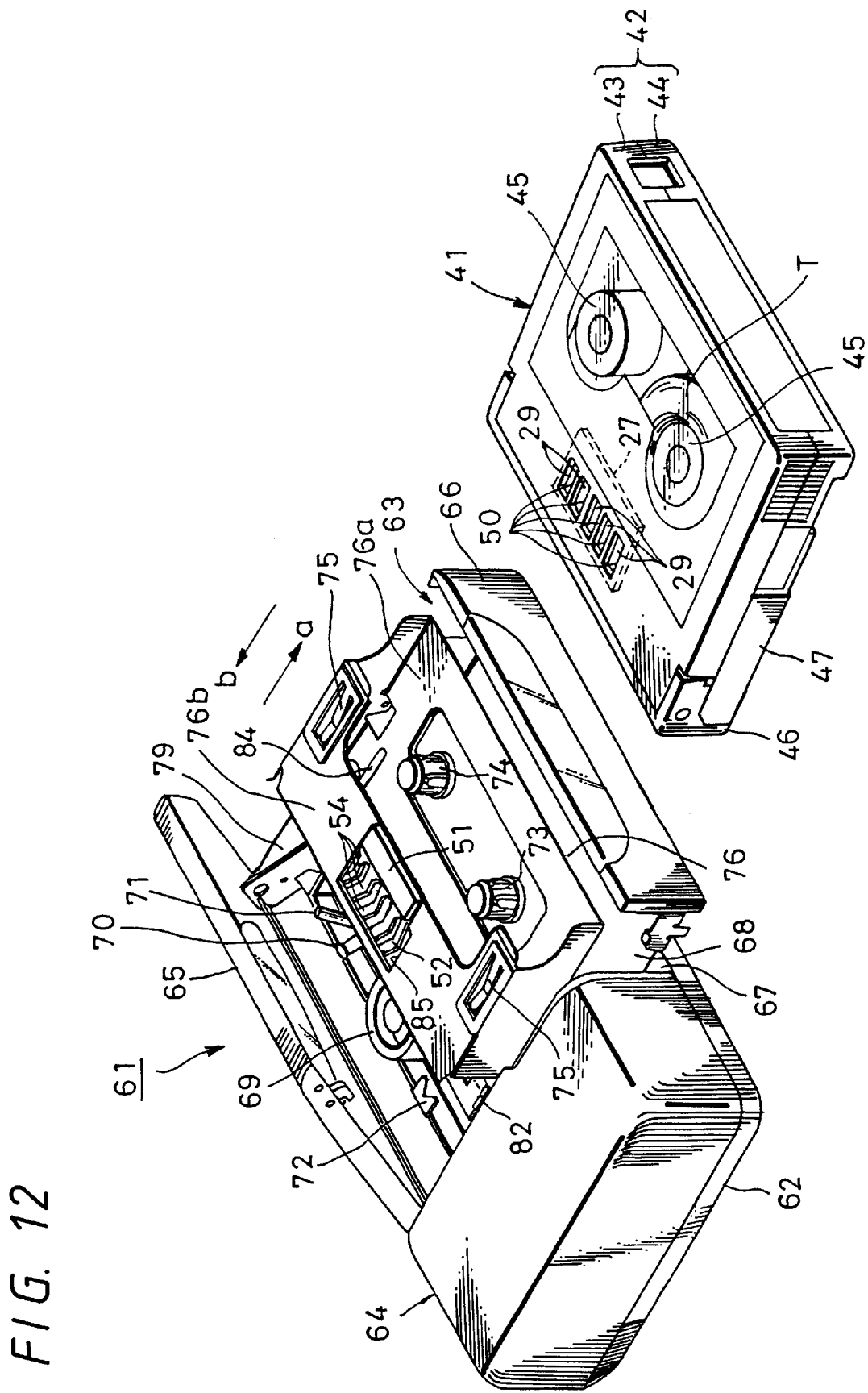
FIG. 12 is a perspective view of the tape cassette shown in FIG. 9 and a recording and/or reproduction system in an opening state according to an example of application of the invention.
Figure 13:
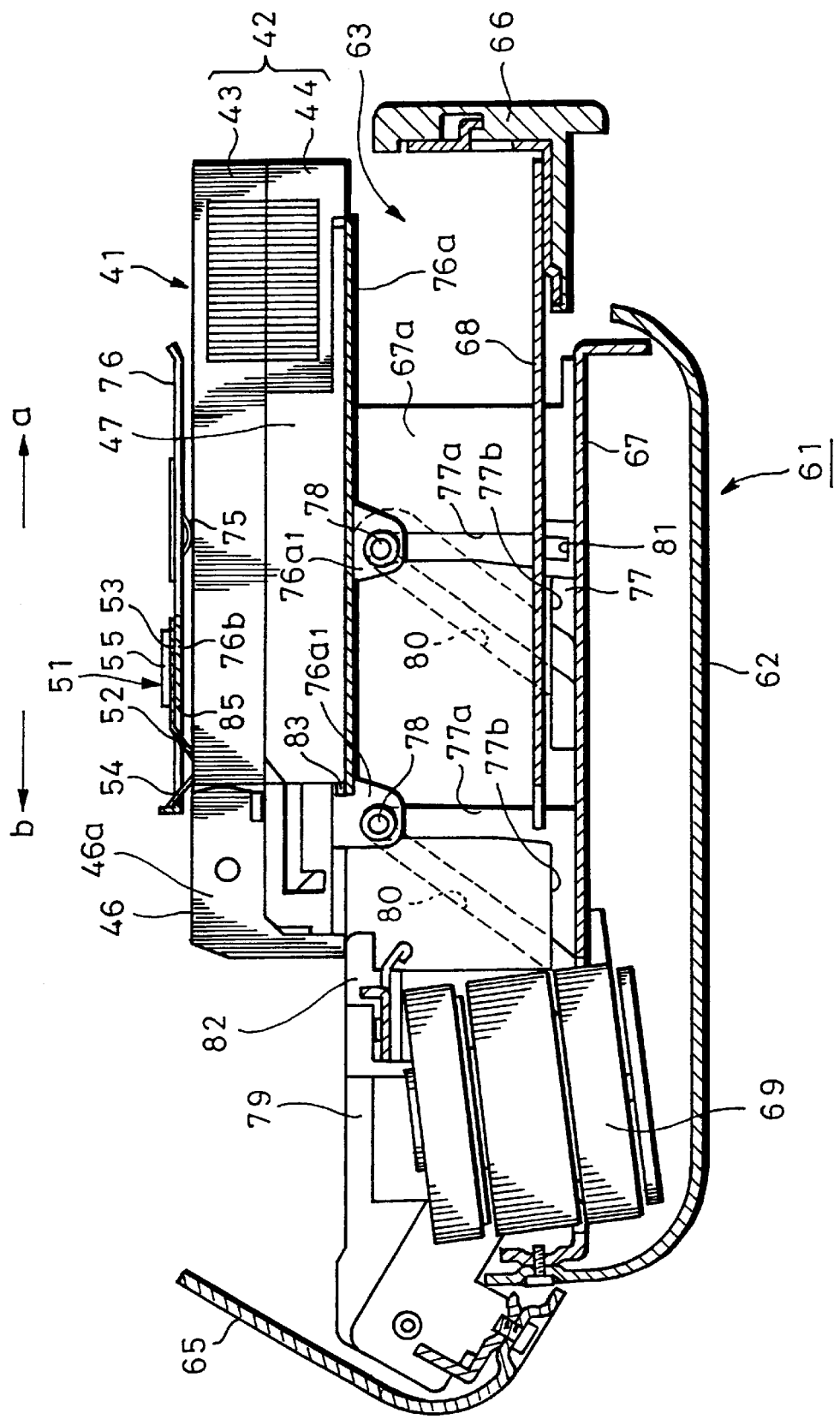
FIG. 13 is a side sectional view, partly not shown, of the recording and/or reproduction system of FIG. 12 in which the tape cassette of FIG. 9 is inserted and held.
Figure 15:
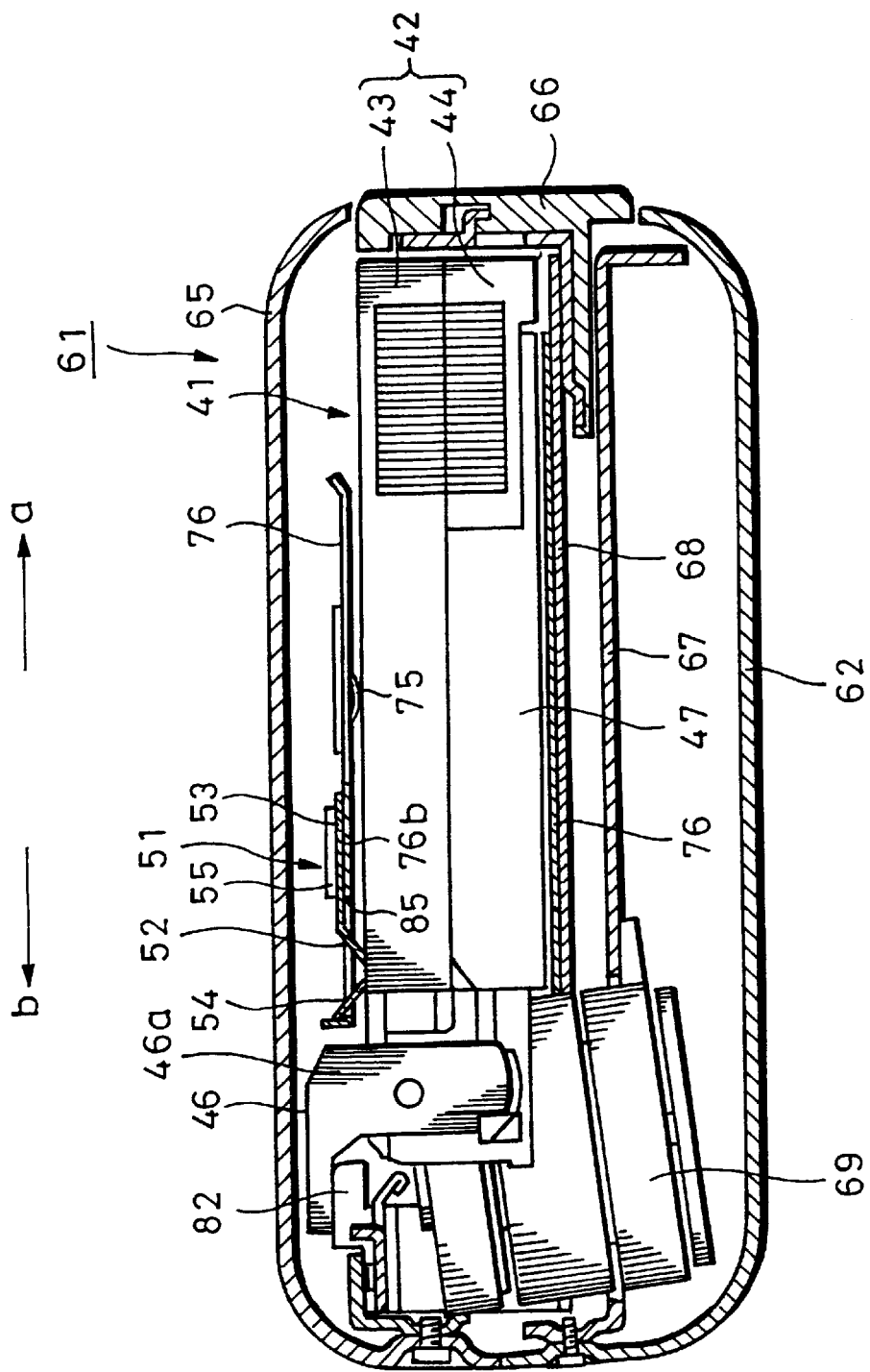
FIG. 15 is a side sectional view of the recording and/or reproduction system of FIG. 12 having a tape cassette mounted thereon with the internal mechanism not shown.

The recording and/or reproduction system according to this embodiment is a compact portable recording and reproduction system. In FIGS. 12, 13, 15, reference numeral 61 designates a general configuration of the recording and reproduction system, numeral 62 a housing, numeral 63 a tape cassette accommodating portion (hereinafter referred to as the cassette accommodating portion), and numeral 64 a battery accommodating portion adjacent to the cassette accommodating portion 63. The cassette accommodating portion 63 is open from the upper surface side thereof to the front surface side thereof. The upper surface side is closed by a lid 65, and the front surface side is closed by a front panel 66.

A main chassis 67 is fixed on the bottom surface side of the cassette accommodating portion 63. A subchassis 68 is disposed in a longitudinally slidable engagement on the main chassis 67 as shown in FIGS. 13 and 15 (in FIGS. 12, 13, 15, the forward direction is indicated by arrow a, and the backward direction by arrow b). A rotary head cylinder 69 is arranged on the rear portion side (inner end portion side) of the main chassis 67. An inclined guide roller 70 and an inclined guide 71 are arranged at a predetermined interval with each other on the outlet side of the rotary head cylinder 69. A substantially V-shaped stopper 72 for positioning an inlet-side guide roller (not shown) moved and operated by the sliding of the subchassis 68 is arranged in the neighborhood of the inlet side of the rotary head cylinder 69.

The subchassis 68, on the other hand, has arranged thereon a hub driving shaft 73 for the supply side and a hub driving shaft 74 for the take-up side. A group of moveable guide rollers not shown for pulling out the magnetic tape toward the rotary head cylinder 69 and forming a tape path are arranged directly or through a rotary member in the subchassis 68 on the inner end side of the drive shafts.

The main chassis 67 and the subchassis 68 configured as described above are coupled to each other slidably in the longitudinal direction. A return spring is stretched between the chassis 67, 68 so that the subchassis 68 is always biased forward toward the main chassis 67 (in the direction of arrow a).

As a component part related to the main chassis 67 and the subchassis 68, a cassette holder 76 with a cassette holding spring 75 mounted thereon is provided as shown in FIGS. 12, 13 and 15. This cassette holder 76 is open longitudinally, formed in a frame for insertion of the tape cassette 41 from the front side thereof, supported on the main chassis 67 movably vertically and longitudinally and adapted to engage the subchassis 68 when lowered.

Specifically, as shown in FIG. 13, a pair of substantially L-shaped guide holes 77 are formed each including a vertical long hole 77a extending vertically in a support plate 67a formed to rise vertically on each side of the main chassis 67 and a horizontal long hole 77b extending horizontally from the lower end of the vertical long hole 77a rearward (inward). Axial pins 78 mounted on protrusions 76$a_1$ formed on both sides of the lower surface portion 76a of the cassette holder 76 engage the guide holes 77. In this way, the cassette holder 76 is supported on the main chassis 67 movably in vertical and longitudinal directions. Also, a cam plate 79 adapted to slide in longitudinal direction along the outer surface of each support plate 67a of the main chassis 67 is arranged on the same outer surface side. The cam plate 79 is formed with cam holes 80 each including a long hole inclined downward rearward (in the direction of arrow b) and a horizontal long hole extending rearward (in the direction of arrow b) from the lower end of the inclined long hole as holes corresponding to the guide holes 77 of the support plate 67a. The axial pins 78 described above engage the cam holes 80 through the guide holes 77.

This cam plate 79 slides in the longitudinal direction, i.e. rearward (in the direction of arrow b) with the opening operation of the lid 65 and slides forward (in the direction of arrow a) with the closing operation of the lid 65. The rearward (in the direction of arrow b) sliding of the cam plate 79 with the opening operation of the lid 65 causes the inclined long holes of the cam holes 80 to come into sliding contact upward with the axial pins 78 on the cassette holder 76 side. As a result, the axial pins 78 are pushed up and move vertically upward along the vertical long holes 77a of the guide holes 77 of the support plates 67a. Thus, the cassette holder 76 is lifted to such an extent as to be held at the highest position with the lid 65 full open, so that the tape cassette 41 can be inserted.

From this state, the lid 65 is closed and the cam plate 79 is slid forward (in the direction of arrow a). The inclined long holes of the cam holes 80 come into sliding contact downward with the axial pins 78 on the cassette holder 76, so that the axial pins 78 are pressed down and move downward along the vertical long holes 77a of the guide holes 77. As a result, the cassette holder 76 is lowered and placed on the subchassis 68 with the lid 65 closed completely. Under this condition, the axial pin 78 engages an engaging hole 81 formed in opposed relation to the lower end of the vertical long hole 77a of the guide hole 77 on the side of the subchassis 68. Thus, the cassette holder 76 engages the subchassis 68 in the longitudinal direction.

Under this condition, the subchassis 68 is slid rearward (in the direction of arrow b) with respect to the main chassis 67.

Then, the cassette holder 76 is slid integrally therewith and comes into proximity to the rotary head cylinder 69. In the process of sliding, each axial pin 78 is moved along the horizontal long hole 77b of the guide hole 77 of the support plate 67a and the horizontal long hole of the cam hole 80 of the cam plate 79, thereby sliding the subchassis 68 stably.

The rearward (in the direction of arrow b) slide of the subchassis 68 causes a group of the move guide rollers arranged on the inner end portion side of the subchassis 68 to move to a predetermined position in the neighborhood of the rotary head cylinder 69 thereby to form a tape path.

Also, an opening member 82 for opening the front lid 46 of the tape cassette 41 is arranged above the inner end portion of the subchassis 68. The lower surface portion 76a of the cassette holder 76 has the inner edge thereof formed with an engaging pawl 83 of the slider 47 and the two sides of the intermediate portion thereof formed with an unlocking protrusion 84 of the slider 47 as shown in FIG. 12.

By the way, the recording and/or reproduction system 61 has built therein, in addition to the component parts described above, other component parts similar to those of the well known system such as a driving motor, a gear mechanism for conducting the driving power and so on, which are not shown nor explained.

The recording and/or reproduction system 61 constituting an example of the configuration described above has built therein the information detecting unit 51 described above. This information detecting unit 51 is mounted on the cassette holder 76 of the recording and/or reproduction system 61. Specifically, as shown in FIGS. 12 to 15, the information detecting unit 51 is such that an upper surface portion 76b of the cassette holder 76 where the cassette holding spring 75 is mounted is formed with an opening 85 in the central portion of the inner end portion side thereof, and the terminals 54 of the detection external terminal 52 are elastically protruded inward from the opening 85 and fixed on the board 53.

The tape cassette 41 having the IC board 27 fixedly built therein is recorded in and reproduced from in the following manner by the recording and/or reproduction system 61 with the information detecting unit 51 mounted on the cassette holder 76 as described above. As shown in FIG. 13, when the tape cassette 41 is inserted from the front opening into the cassette holder 76 held at the highest position by the opening of the lid 65, the slider 47 is unlocked by the unlocking protrusion 84 formed on the lower surface portion 76a as in the conventional tape cassette described above. At the same time, the front end edge of the slider 47 comes to engage the engaging pawl 83 at the inner end edge of the lower surface portion 76a. Under this condition, the tape cassette 41 is further pressed in. Then, the slider 47 is left behind, so that the pocket portion of the cassette body 42 is opened while at the same time opening the reel shaft insertion holes in overlapped relation with the reel shaft insertion holes of the slider 47.

Figure 14:
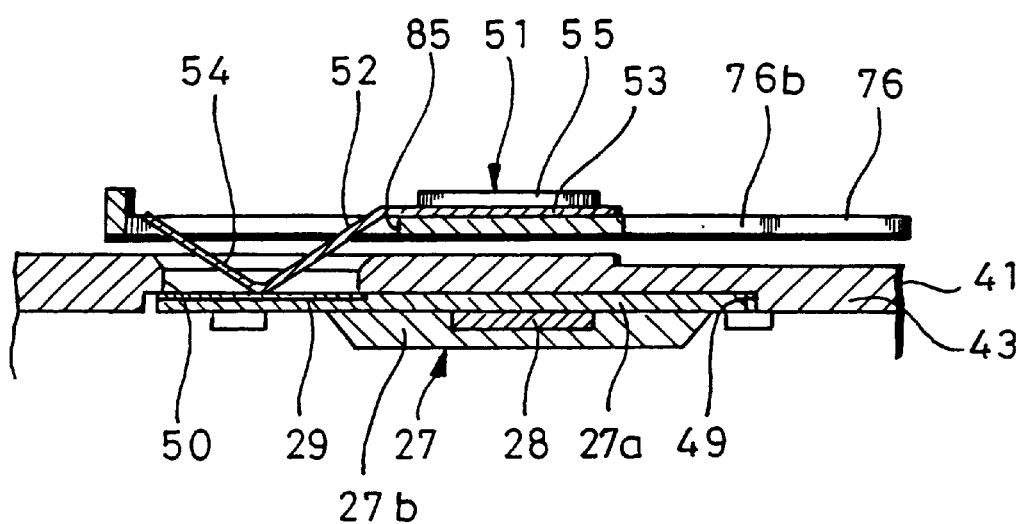
FIG. 14 is an enlarged sectional view of the essential parts of FIG. 13.

Under this condition, the tape cassette 41, as shown in FIG. 14, has each window hole 50 at the front central portion of the upper half portion 43 thereof corresponding to the terminal portion 54 of the detection external terminal 52 of the information detecting unit 51. The terminal portion 54 is inserted downward into the window hole 50 by the elasticity of itself and brought into contact and electrically connected with the output terminal 29 of the IC board 27 located in a corresponding position on the interior of the window hole 50. As a result, the information of the magnetic tape T in the tape cassette 41 is stored in the IC board 27, or the information stored is searched for and read out.

In this way, with the information stored in or read from the IC board 27 in the tape cassette 41, the lid 65 is closed. Then, as described above, the cassette holder 76 is lowered, so that the tape cassette 41 has the front lid 46 thereof brought into contact with the opening member 82 and opened upward. At the same time, the opening operation of the front lid 46 unlocks the reel hubs 45, 45 which have thus far been locked by the locking member 48. Under this condition, the hubs 45, 45 placed on the cassette mounting portion, i.e. the subchassis 68 come to engage the hub driving shafts 73, 74, and the group of moveable guide rollers for pulling out the magnetic tape are located in corresponding positions inside of the magnetic tape in the pocket portion of the cassette body 42.

Under this condition, the tape cassette 41 is elastically pressed by the cassette holding springs 75 mounted on both sides of the upper surface portion 76b of the cassette holder 76 on the one hand and through the IC board 27 by the terminal portions 54 of the detection external terminal 52 of the information detecting unit 51 at the same time. In view of the fact that the elasticity of the terminal portions 54, i.e. the spring pressure of the detection external terminal 52 is set to substantially the same value of about 50 to 100 g as that of the spring for urging the front lid 46 of the tape cassette 41 in the closing direction, the tape cassette 41 is pressed against the lid-closing spring force of the front lid 46, i.e. the force to lift the cassette body 42 by the lid-closing force. Thus, the cassette 41 is held stably on the subchassis 68 providing the cassette mounting portion. Under this condition, as shown in FIG. 15, the subchassis 68 is slid rearward (inward) whereby the magnetic tape T is pulled out by the group of move guide rollers and wound into sliding contact with the rotary head cylinder 69 for the recording and reproduction operation.

In the embodiment configured as described above, the IC board 27 constituting the storage unit for storing the information of the magnetic tape T accommodated in the tape cassette 41 is fixedly built in at the substantial center of the front central side of the upper half portion 43 of the tape cassette 41. On the other hand, the information detecting unit 51 is arranged on the upper surface 76b side of the cassette holder 76 of the recording and/or reproduction system 61, and the terminal portions 54 of the detection external terminal 52 are elastically protruded inward of the cassette holder 76. Then, simply by inserting the tape cassette 41 into the cassette holder 76, the information of the accommodated magnetic tape T can be searched and read. Thus, the search time can be considerably reduced. Also, in the case where the tape cassette has different contents than desired, it can be immediately replaced with the desired tape cassette.

In this embodiment, with the tape cassette 41 mounted in the cassette mounting portion of the recording and/or reproduction system 61, the IC board 27 fixedly built in the upper half portion 43 is pressed with the required pressure, i.e. with the spring pressure of 50 to 100 g in this embodiment, by the terminal portions 54 of the detection external terminal 52 of the information detecting unit 51 on the cassette holder 76 side of the recording and/or reproduction system 61. Thus, the tape cassette 41, as in the case where it is pressed by the holding spring, is pressed against the cassette mounting portion and held stably.

Figure 16:
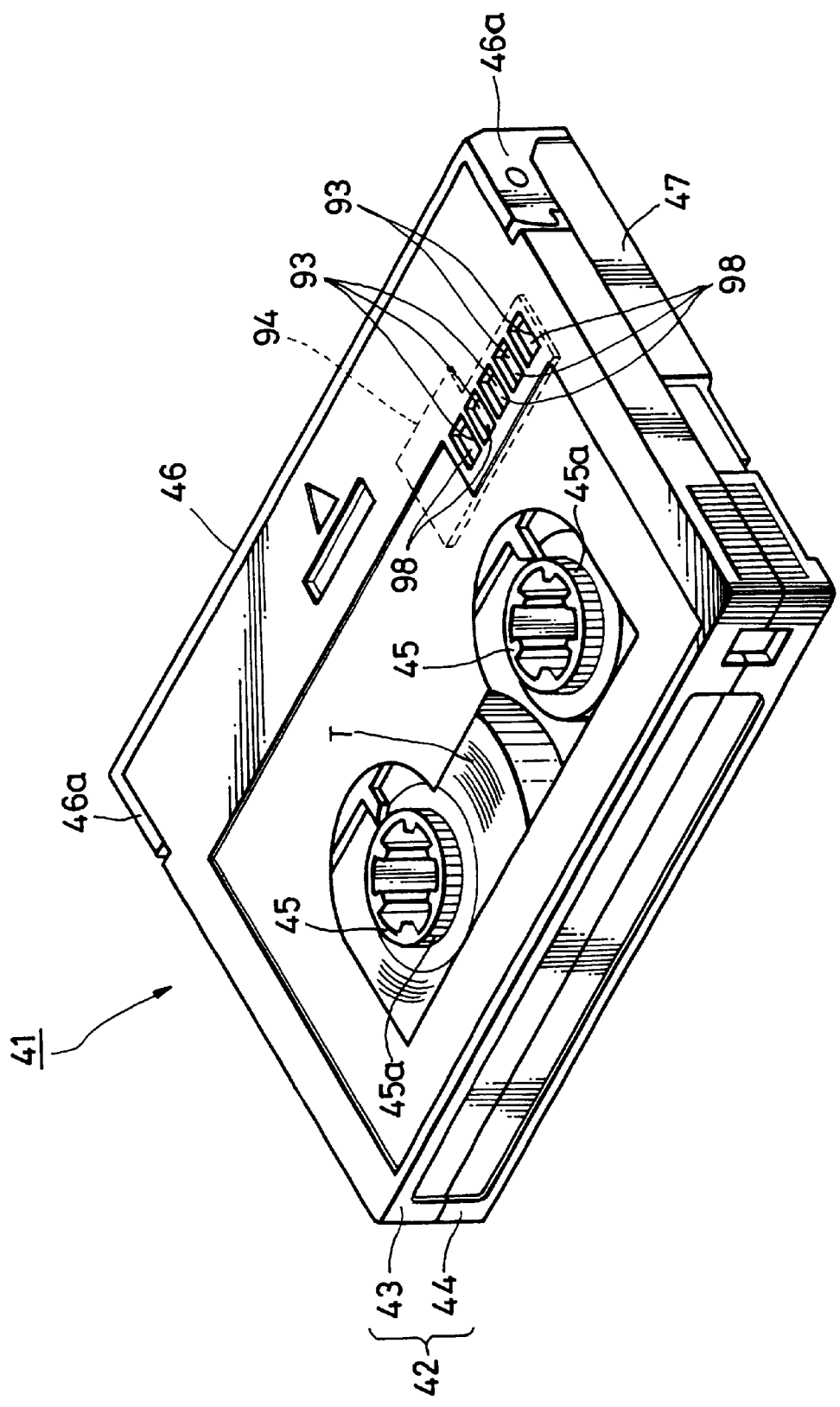
FIG. 16 is a perspective view of a tape cassette according to another example to which the invention is applied.

Now, a second embodiment will be explained with reference to FIGS. 16 to 23. The tape cassette according to this embodiment, as shown in FIG. 16, is configured the same way as the first embodiment described above. Therefore, the same component members in this embodiment as those in the first embodiment will be designated by the same reference numerals as those of the corresponding component parts of the first embodiment and will not be described.

Figure 17:
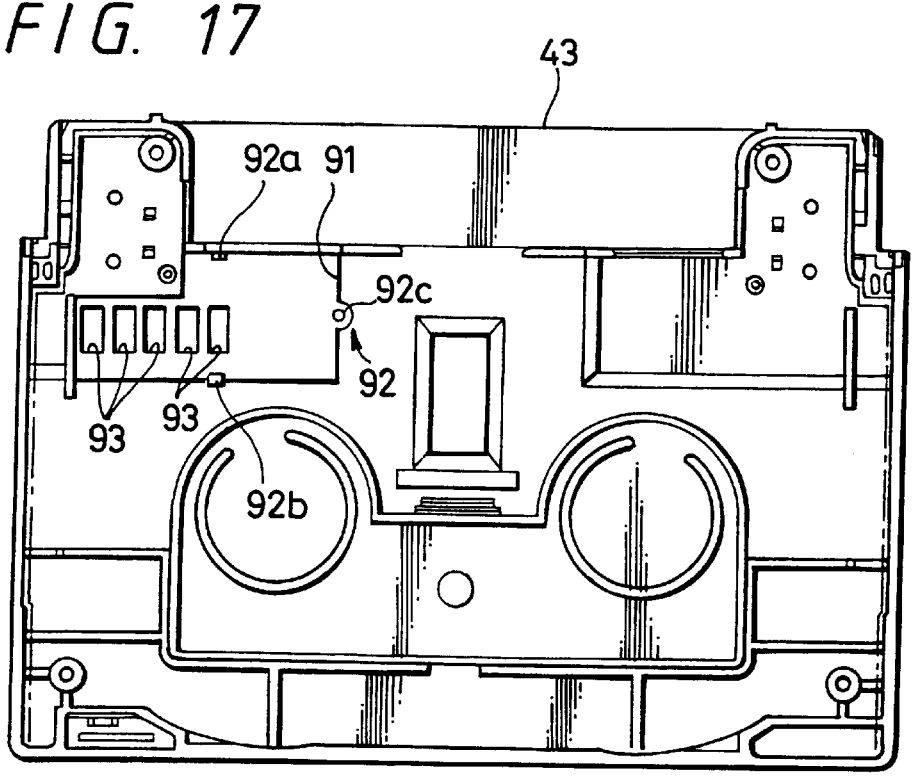
FIG. 17 is a plan view of the inner surface side of the upper half portion of the tape cassette shown in FIG. 16.
Figure 18:
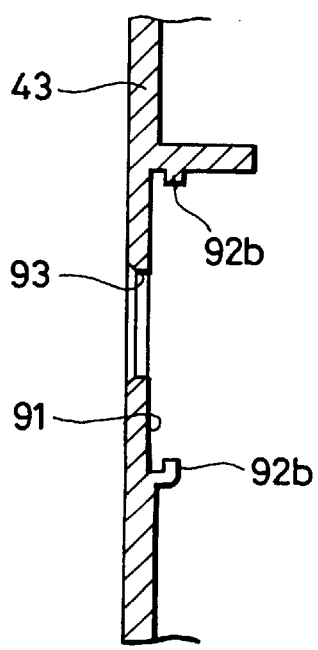
FIG. 18 is an enlarged longitudinal sectional view of the essential parts of the upper half portion shown in FIG. 17.
Figure 19:
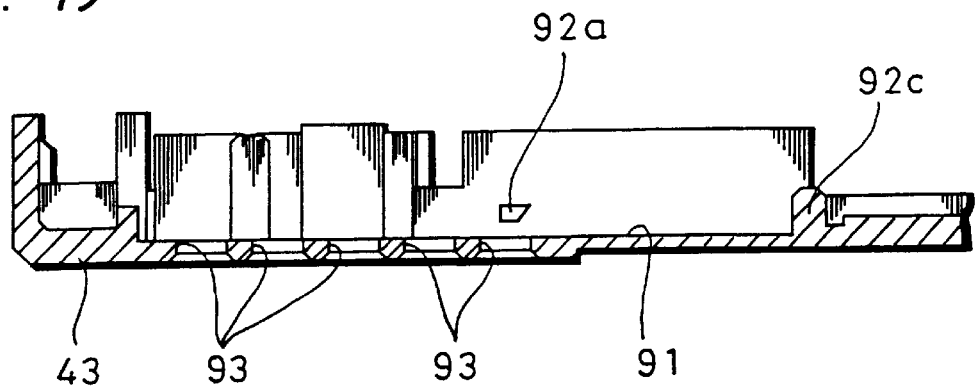
FIG. 19 is an enlarged cross sectional view of the essential parts of the upper half portion shown in FIG. 17.

In this embodiment, the IC board constituting the storage unit for storing the information of the magnetic tape T accommodated in the tape cassette 41 is fixedly built in a part of the front side of the upper half portion 43 of the tape cassette 41. Specifically, as shown in FIGS. 17 to 19, the inner surface side of a part of the front side of the upper half portion 43 of the tape cassette 41 is formed with a portion 91 in the form of a laterally long recess for fixedly building in the IC board described later. Engaging-protrusions 92 (92a, 92b, 92c) are protrusively formed on the peripheral edge of this fixing portion 91. Thus, as shown in FIG. 18, the engaging protrusions 92a and 92b on the front and rear edge sides, respectively, are formed in such a shape as to be engaged by the inserted edge of the IC board. Also, as shown in FIG. 19, the engaging protrusion 92c on the inner edge side is formed in the shape of pin. A plurality of window holes 93 through which the output terminals of the IC board face the surface side are formed at positions on the outer side of the laterally long recessed fixing portion 91.

Figure 20:
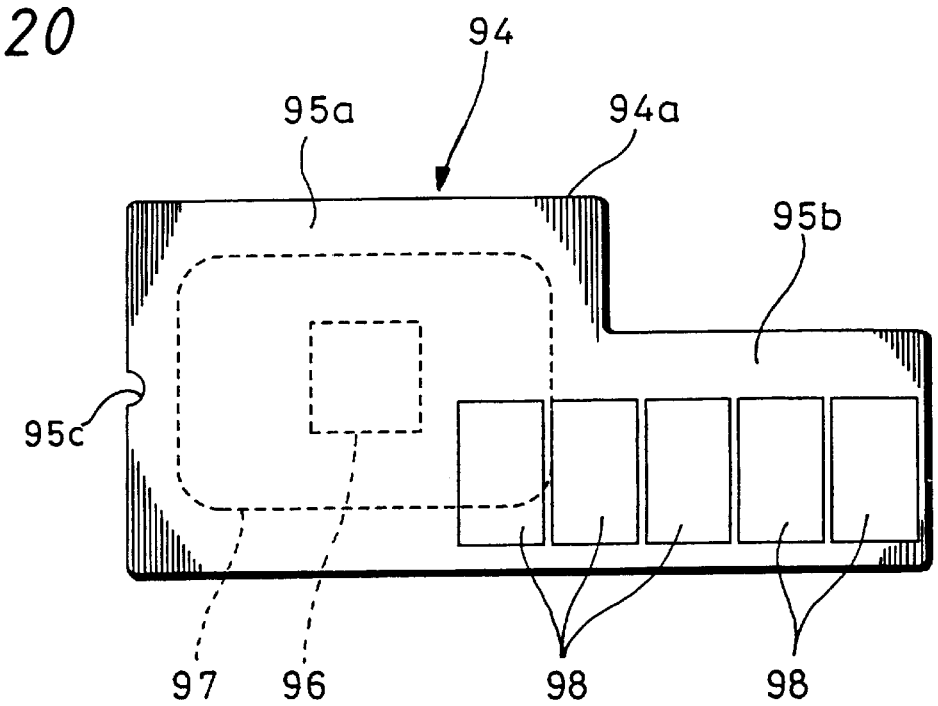
FIG. 20 is a front view of the IC board according to an example to be built in the tape cassette shown in FIG. 16.
Figure 21:
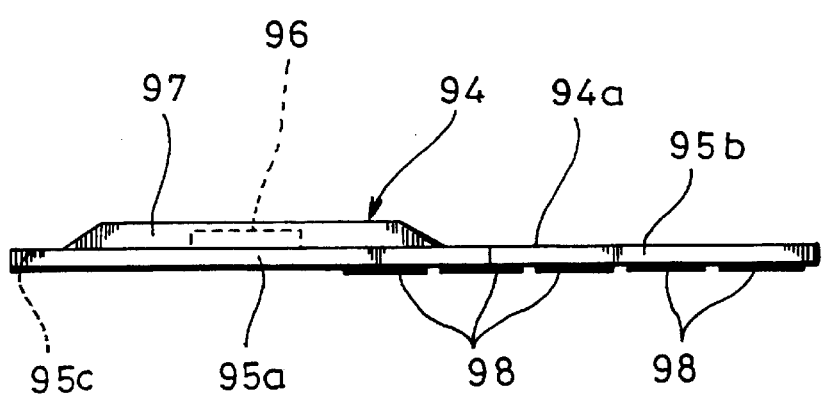
FIG. 21 is a top plan view of the IC board shown in FIG. 20.

As described above, the IC board constituting the storage unit fixedly built in the fixing portion 91 formed on the inner surface side of the upper half portion 43 of the tape cassette 41 is configured as shown in FIGS. 20 and 21. This IC board 94 includes a laterally long rectangular board portion 94a of epoxy resin, other engineering plastics (POM) or the like, and an IC mounting surface 95a is formed on the inner surface side of the inner half portion of the board portion 94a. A terminal surface 95b is formed on the outer surface of the outer half portion of the board portion 94a. Also, a notched recess 95c is formed at the central portion of the inner edge of the inner half portion. The IC mounting surface portion 95a of this board portion 94a has mounted thereon an IC chip 96 for recording the information at substantially the central portion thereof. This IC chip 96 is covered by a protective layer 97 and connected to each of a plurality of output terminals 98 formed on the terminal surface 95b. By the way, the front edge side of the outer half portion of the board portion 94a of the IC board 94 is formed in the shape of a notch due to the relative positions of the members on the inner surface side of the upper half portion 43.

Figure 22:
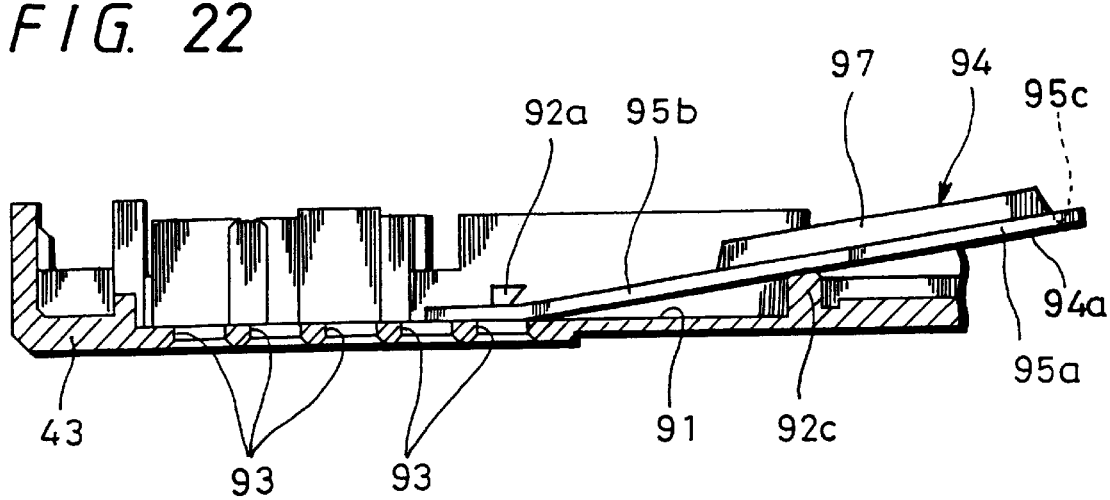
FIG. 22 is a sectional view of the IC board of FIG. 20 built in the upper half portion of FIG. 17.
Figure 23:
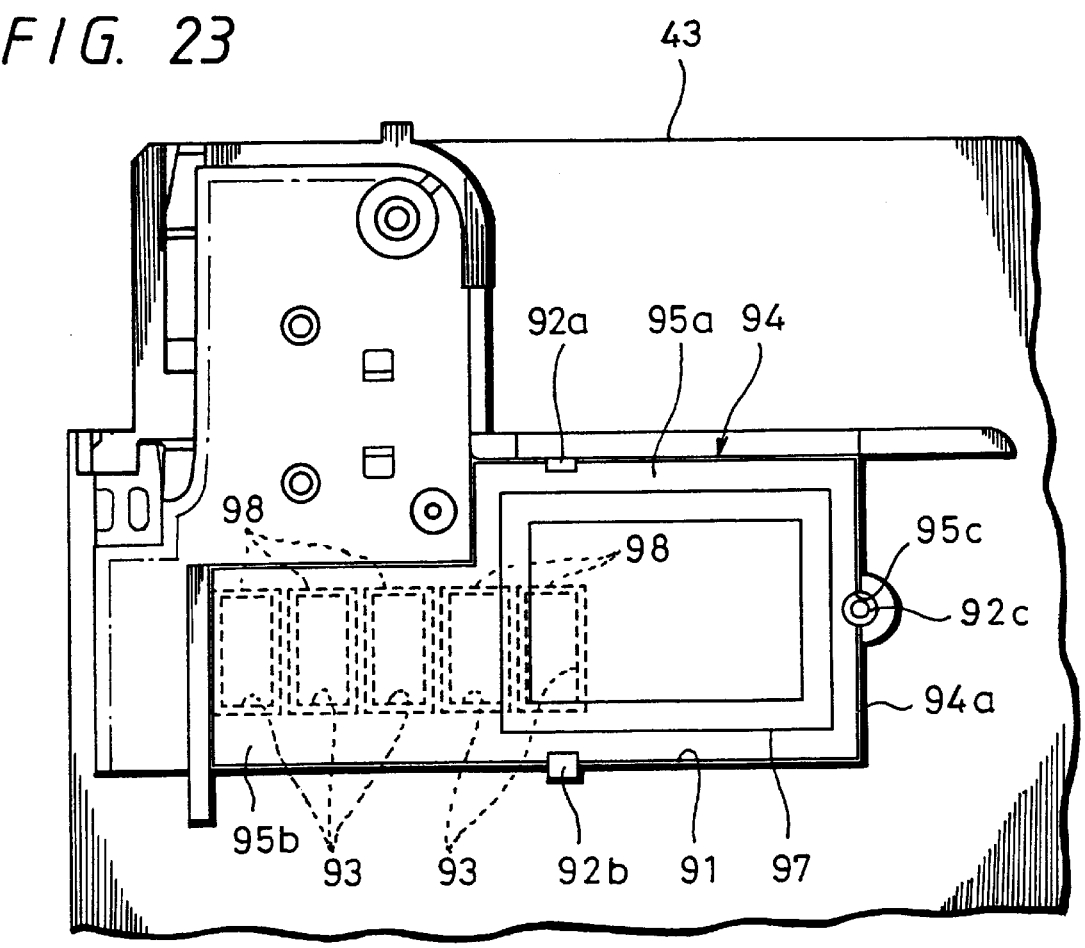
FIG. 23 is a plan view of the inner surface side of the essential parts with the IC board of FIG. 20 built in the upper half portion of FIG. 17.

The IC board 94 configured this way is fixedly built in the fixing portion 91 formed on the inner surface side of the upper half portion 43 of the tape cassette 41, as shown in FIGS. 22 and 23. Specifically, as shown in FIG. 22, the IC board 94 is located in a position corresponding to the fixing portion 91 from the inner side thereof, and the front and rear edges of the board portion 94a are inserted between the engaging protrusions 92a, 92b on the front and rear edge sides of the fixing portion 91, so that the notched recess 95c on the inner end edge engages the engaging protrusion 92c on the inner edge side, thereby fixedly building in the IC board. In the process, the forward end portion of the engaging protrusion 92c is caulked by fusion for fixedly building in the IC board 94 more securely.

In the recording and/or reproduction system for recording in and reproducing from the tape cassette 41 with the IC board 94 fixedly built in a part of the front side of the upper half portion 43 as described above, the information detecting unit described in the first embodiment is arranged on one side of the upper surface portion of the cassette holder in such a manner that the terminal portions of the detection external terminal thereof are elastically protruded inward of the cassette holder in such positions corresponding to the window holes 93 of the upper half portion 43 of the tape cassette 41 to be inserted in the cassette holder.

In the second embodiment configured as described above, the IC board 94 constituting the storage unit for storing the information of the magnetic tape T accommodated in the tape cassette 41 is fixedly built in one part of the front side of the upper half portion 43 of the tape cassette 41. On the other hand, the information detecting unit is arranged on a part of the upper surface side of the cassette holder of the recording and/or reproduction system, and the terminal portions of this detection external terminal are elastically protruded inward of the cassette holder. As a result, as in the first embodiment described above, simply by inserting the tape cassette 41 into the cassette holder, the output terminals 98 of the IC board 94 are brought into contact and connected through the window holes 93 with the terminal portions of the detection external terminal of the information detecting unit, thereby to search and read the information of the accommodated magnetic tape T. Thus, the search time can be considerably reduced, and in the case of a tape cassette having contents different from a desired one, it can be immediately replaced by the required tape cassette.

Also according to this second embodiment, with the tape cassette 41 mounted in the cassette mounting portion of the recording and/or reproduction system, the IC board 94 fixedly built in the upper half portion 43 of the tape cassette 41 is subjected, through the window holes 93, to a predetermined pressure from the terminal portions of the detection external terminal of the information detecting unit included in the cassette holder of the recording and/or reproduction system. Consequently, as in the case where it is pressed by the holding spring, the tape cassette 41 is pressed against the cassette mounting portion and held stably.

Further, FIGS. 24 to 27 show a third embodiment. In this third embodiment, the IC board constituting the storage unit for storing the information of the magnetic tape accommodated in the tape cassette is fixedly built in the slider for opening and closing a predetermined opening of the tape cassette.

A tape cassette 101 according to this embodiment has a general structure substantially the same as that of the tape cassette shown in FIGS. 1 to 3A, 3B. A cassette body 102 is such that an upper half portion 103 and a lower half portion 104 are combined by screws or fusion into a box shape. The magnetic tape is accommodated in this cassette body 102. The lower surface side of the cassette body 102, i.e. a bottom surface portion 104a of the lower half portion 104 is formed with a pair of left and right reel shaft insertion holes 105, 105. A pair of reel hubs 106, 106 with the magnetic tape T wound thereon are rotatably accommodated at the positions on the reel shaft insertion holes 105, 105. This magnetic tape, like the tape cassette described above, is sandwiched by slide sheets on the upper and lower sides thereof and accommodated between the upper and lower half portions 103, 104, and through tape guide portions 107, 107 arranged at both sides of front portion of the lower half portion 104, led out and exposed on the front side of the cassette body 102. Also, a recessed loading pocket portion 108 is formed between both the tape guides 107, 107 on the front portion of the lower half portion 104, so that the tape-loading guide member of the magnetic recording and/or reproduction system intrudes thereto to pull out the magnetic tape forward of the cassette body 102.

On the front end portion of the upper half portion 103, on the other hand, a front lid 109 for opening and closing the magnetic tape exposure portion on the front side of the cassette body 102 is mounted vertically rotatably about side plates 109b formed at both end portions of the main plate portion 109a. When the tape cassette 101 is not used, the front lid 109 closes the magnetic tape exposure portion between the tape guides 107, 107 on the front side of the cassette body 102. This front lid 109 rotates and opens upward by the mechanism in the magnetic recording and/or reproduction system, so that the magnetic tape is exposed. With the front lid 109 open by rotation, the lock member for stopping rotations of the reel hubs is unlocked.

Also, a slider 110 constituting a member for closing the opening is mounted slidably longitudinally on the lower surface side of the cassette body 102, i.e. the lower surface side of the bottom surface portion 104a of the lower half portion 104. This slider 110 is formed with reel shaft insertion holes 111, 111 corresponding to the reel shaft insertion holes 105, 105 of the lower half portion 104. At the forward sliding position (closing position) of the slider 110, the reel shaft insertion holes 105, 105 of the lower half portion 104 and the loading pocket portion 108 are closed, while at the rearward sliding position (opening position) thereof, on the other hand, the reel shaft insertion holes 105, 105 of the lower half portion 104 are opened outward in positions corresponding to the reel shaft insertion holes 111, 111 while at the same time opening the pocket portion 108.

In this way, also in the tape cassette 101 according to this embodiment, when the front lid 109 and the slider 111 are in a position for closing the cassette body 102 not in use, the front open portion, the reel shaft insertion holes 105, 105 and the pocket portion 108 of the cassette body 102 are closed so that the interior of the cassette body 102 is hermetically closed. Thus the magnetic tape T accommodated therein is protected against the adhesion of dust or the like.

In the tape cassette 101 according to this embodiment, the IC board 27 described above constituting the storage element unit for storing the information of the accommodated magnetic tape is fixedly built in the slider 110.

Figure 25:
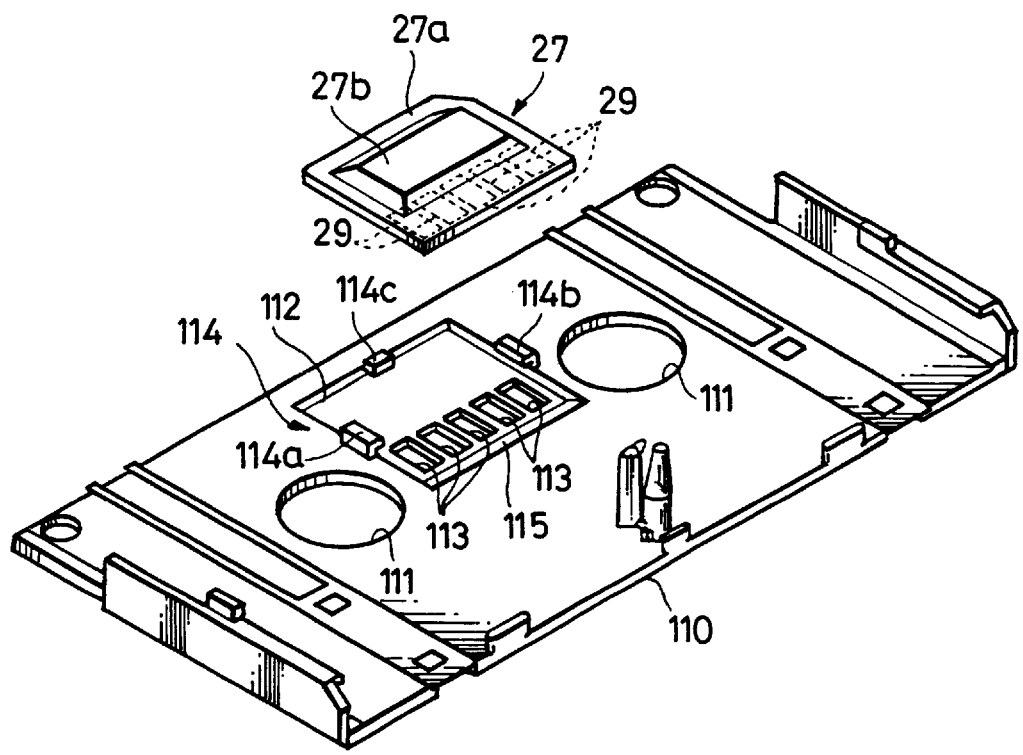
FIG. 25 is a perspective view, partly exploded, of the inner surface side of the slider of the tape cassette shown in FIG. 24.

Specifically, as shown in FIG. 25, a recessed fixing portion 112 for building in the IC board 27 is formed at the central inner surface of the tape cassette 101, or more specifically, in the portion extending from between the reel shaft insertion holes 111, 111 to the rear edge portion, and a plurality of window holes 113 through which the output terminals 29 of the IC board 27 face the outer surface side are formed at the front of the fixing portion 112. On both side edge portions and the rear edge of the fixing portion 112 protrusively are formed engaging protrusions 114 (114a, 114b and 114c) adapted to be inserted and engaged by both the side edges and the rear edge of the board portion 27a of the IC board 27. Also, the front edge portion of the fixing portion 112 is formed with an inclined surface 115.

For fixedly building the IC board 27 in the fixing portion 112 formed on the inner surface side of the slider 110 as described above, the inclined surface 115 of the front edge portion of the IC board 27 is inserted into the fixing portion 112 in such a position that the output terminals 29 face the window holes 113, respectively, and both the side edges of the board portion 27a are inserted and engage the engaging protrusions 114a, 114b. At the same time, the two side edges of the rear end edge are inserted forcibly and engage the rear-edge engaging protrusion 114c whereby the IC board 27 is fitted in the fixing portion 112 and fixed on the engaging protrusions 114 (114a, 114b, 114c) by being pressed from above. For building the IC board 27 in the fixing portion 112 of the slider 110 in this way, the IC board 27 is inserted along the inclined surface 115 of the front edge portion. Thus, the IC board 27 can be smoothly inserted into the fixing portion 112 fully up to the rear end edge and securely fixed. The output terminals 29 of the IC board 27 assume a position facing the exterior from the window holes 113 of the slider 110.

Figure 24:
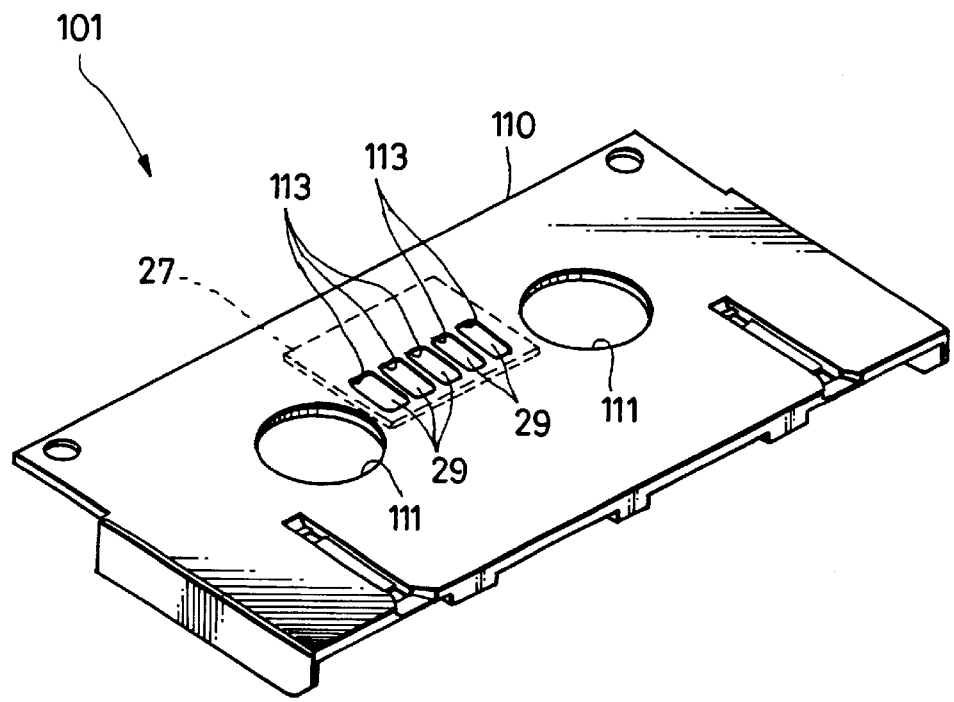
FIG. 24 is a perspective view, partly exploded, from the lower surface side of the tape cassette according to another example of the invention.
Figure 24:
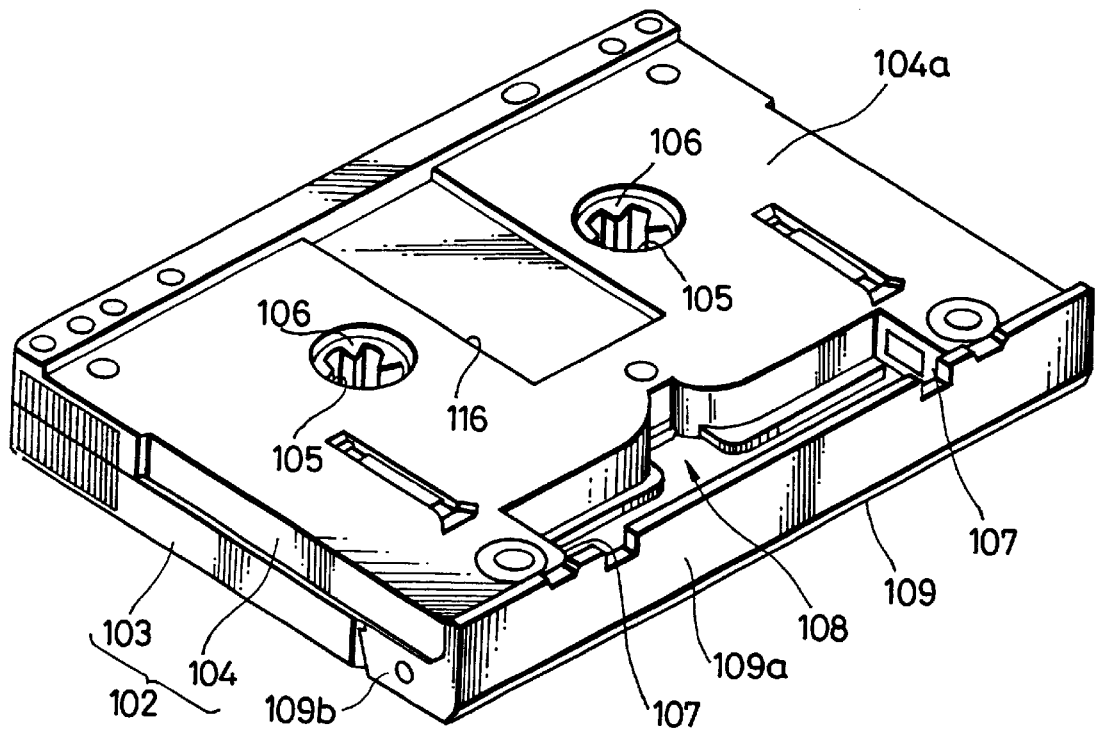

As described above, the slider 110 with the IC board 27 fixedly built therein is slidably mounted on the lower half portion 104 of the cassette body 102. In the sliding motion of the slider 110, as shown in FIG. 24, the lower surface side of the lower half portion 104 is formed with a recessed portion 116 corresponding to the fixing portion 112 on the slider 110, i.e. corresponding to the range of movement of the IC board 27 with the sliding of the slider 110 in order to prevent the contact with the IC board 27 and the engaging protrusions 114 of the fixing portion 112.

The recording and/or reproduction system as shown in FIGS. 12 to 15 according to the first embodiment described above can be used as a recording and/or reproduction system for recording in and reproducing from the tape cassette 101 with the IC board 27 fixedly built in the slider 110. In this case, the information detecting unit described above is mounted on the lower surface side of the cassette holder for detecting and reading the information stored in the IC board.

Figure 26:
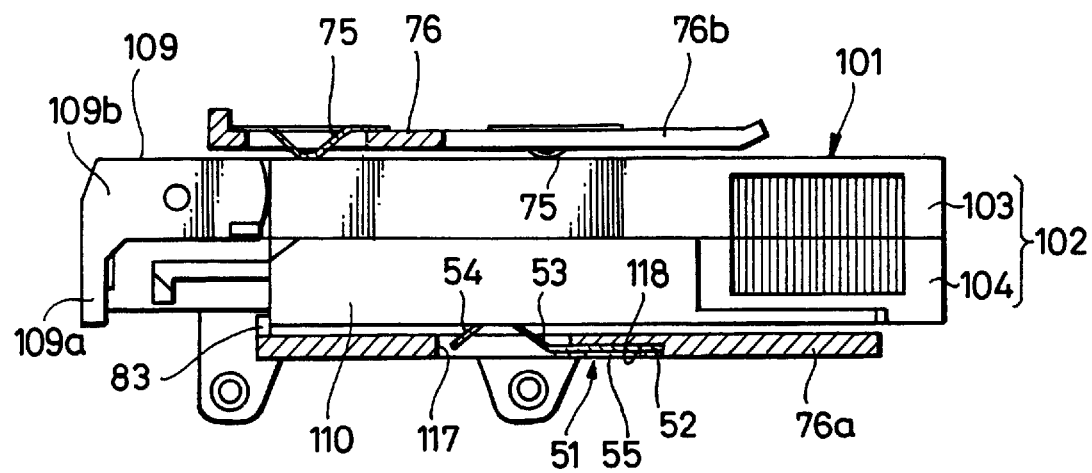
FIG. 26 is a side sectional view of the tape cassette of FIG. 24 inserted in the cassette holder of the recording and reproduction system.
Figure 27:
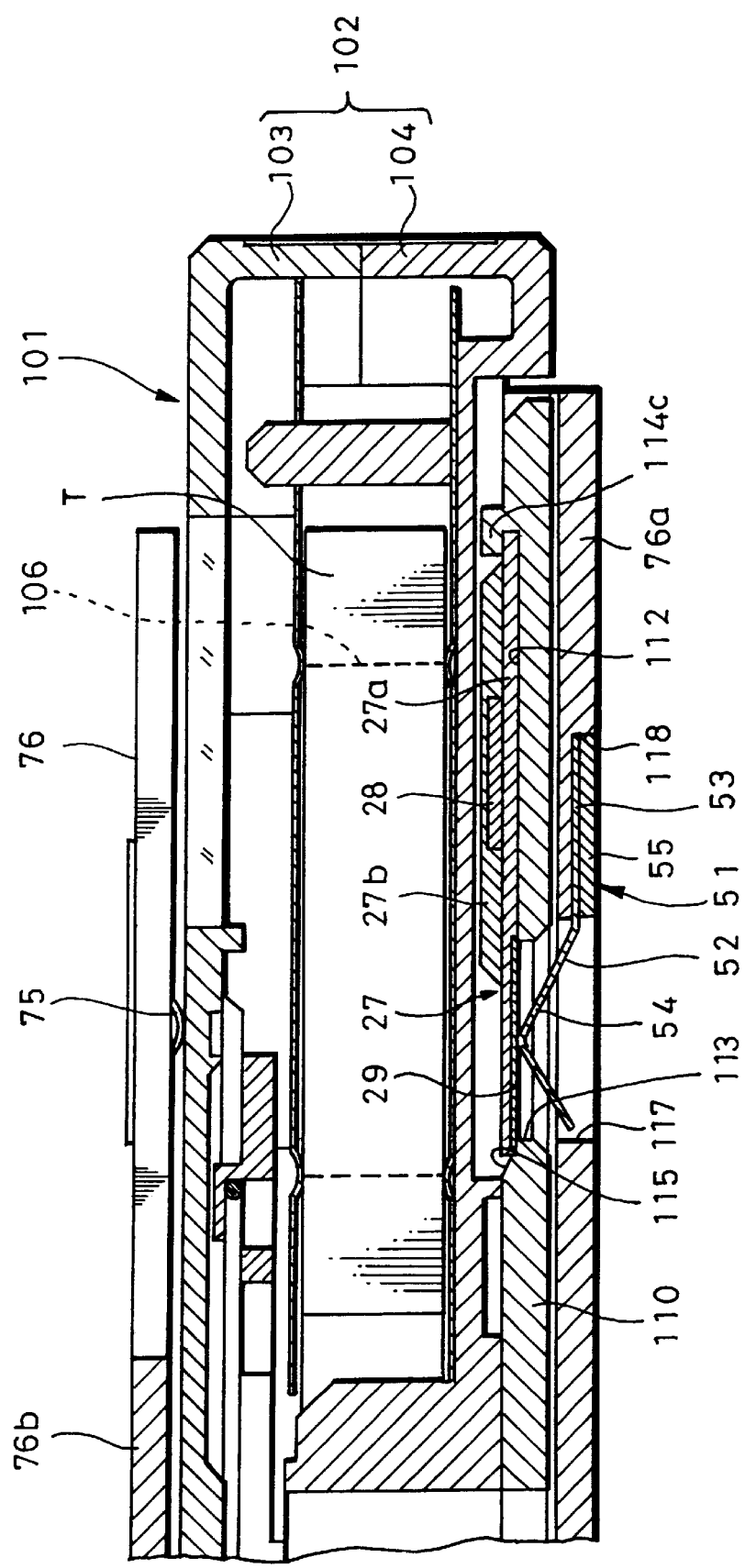
FIG. 27 is an enlarged sectional view of the essential parts in FIG. 26.

Specifically, as shown in FIGS. 26 and 27, an opening 117 is formed substantially at the central portion of the lower surface portion 76a of the cassette holder 76, and a mounting recess 118 is formed in the lower side surface continued from the opening 117. The board portion 53 having mounted thereon the IC memory read chip 55 providing the body of the information detecting unit 51 described above is fixedly fitted in this mounting recess 118. The terminal portions 54 of the detection external terminal 52 are elastically protruded inward of the cassette holder 76 from the opening 117.

When the tape cassette 101 is inserted into the cassette holder 76 in this way with the information detecting unit 51 mounted on the lower surface portion 76a thereof until the slider 110 comes to engage the engaging pawl 83 at the inner end edge of the lower surface portion 76a, the window holes 113 come in registry with the terminal portions 54 of the detection external terminal 51 of the information detecting unit 51. Thus the terminal portions 54 are elastically inserted by the elastisity thereof into the window holes 113 and press themselves into contact with the output terminals 29 of the IC board 27 corresponding to the window holes 113. Thus the IC board 27 and the information detecting unit 51 are connected to each other, so that the information detecting unit 51 searches and reads the stored information of the IC board 27.

In the third embodiment configured as described above, the IC board 27 constituting the storage element unit for storing the information of the magnetic tape T accommodated in the tape cassette 101 is fixedly built in the slider 110 of the tape cassette 101. On the other hand, the information detecting unit 51 is arranged on the lower surface potion 76a side of the cassette holder 76 of the recording and/or reproduction system, and the terminal portions 54 of the detection external terminal 52 are elastically protruded inward of the lower surface portion 76a. In this way, simply by inserting the tape cassette 101 into the cassette holder 76, the output terminals 29 of the IC board 27 come into contact with the terminal portions 54 of the information detecting unit 51. Thus the IC board 27 is connected to the information detecting unit 51 which can search and read the information of the accommodated magnetic tape T. Consequently, the search time can be considerably reduced while at the same time making it possible to exchange the tape cassette with a desired one immediately whenever the tape cassette has contents different from the desired one.

Also, according to this embodiment, by inserting the tape cassette 101 into the cassette holder 76 of the recording and/or reproduction system, the upper surface side of the tape cassette 101 is pressed by the holding spring 75 mounted on the upper surface portion 76b of the cassette holder 76. At the same time, the terminal portions 54 of the detection external terminal 52 of the information detecting unit 51 are pressed, through the window holes 113, against the IC board 27 fixedly built in the slider 110 with the required spring pressure. Thus pressure is applied also from the lower surface side. As a result, the tape cassette 101 is stably held in the cassette holder 76, i.e. stably held in the cassette mounting portion.

Embodiments of the invention have been described above. The present invention, however, is not limited to these embodiments but can be variously modified without departing from the spirit of the invention.

For example, the DAT cassette was taken up and described as an example of a cassette for accommodating the recording medium. The cassettes for accommodating the recording medium with the IC board fixedly built in the upper surface side thereof as a storage unit include a recording medium accommodating cassette having no closing member such as the slider or the like for closing the openings such as the reel shaft insertion holes in the lower surface side of the disk cartridge of the video tape cassette, the floppy disk, etc. Also, a disk cartridge or the like having a shutter as a closing member can be used as a recording medium accommodating cassette with the IC board fixedly built in a closing member such as the shutter for closing the opening in the lower surface side thereof.

Also, a portable recording and/or reproduction system of the type in which the cassette holder can be manually transported was described above. However, the invention is not limited to such a recording and/or reproduction system but is applicable to a recording and/or reproduction system in which the cassette holder can be automatically moved to the cassette mounting portion, i.e. which the cassette can be automatically loaded.

As described above, according to this invention, output terminals of a storage element unit for storing the required information is arranged at positions on the outer surface of a recording medium accommodating cassette, detection external terminals of an information detecting unit are arranged on the inner surface side of a cassette insertion and holding unit of a recording and/or reproduction system in such a manner as to contact the corresponding output terminals. The recording medium accommodating cassette is inserted into the cassette insertion and holding unit thereby to detect and read the information stored in the storage element unit. With this configuration, the required information of the recording medium can be searched and read before the recording medium accommodating cassette is moved to the cassette mounting portion of the recording and/or reproduction system. Thus, the search time can be considerably reduced on the one hand and any recording medium accommodating cassette having different contents than a desired one can be replaced immediately with the required recording medium accommodating cassette on the other hand.

Also, as described above, the detection external terminal of the information detecting unit arranged on the recording and/or reproduction system has the spring pressure thereof set to 50 to 100 g substantially equal to that of the cassette holding spring. In this way, the detection external terminal can double as the cassette holding spring for a reduced number of component parts while making it possible to reduce the cost of the recording and/or reproduction system.

At the same time, the recording and/or reproduction system comprising an information detecting unit can be designed without changing the positions of the anti-erroneous erasure member and the detection external terminal, thereby increasing the design freedom.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A recording and/or reproduction system for a recording medium wherein a cassette accommodating a recording medium is inserted in a predetermined direction into a cassette insertion and holding portion, and after the insertion thereof, the recording medium is moved to a cassette mounting position for recording in and/or reproducing from the recording medium, wherein the cassette includes:
a storage element unit for storing a required information of the recording medium, and output terminals of the storage element unit exposed on an outer surface of the cassette;
information detection terminals for an information detecting unit corresponding to the output terminals of the storage element unit on the cassette side are arranged on an inner surface side of the cassette insertion and holding portion; and
the required information is read from the storage element unit before the cassette is moved to the cassette mounting position, wherein the output terminals of the storage element unit are exposed on the outer surface of the cassette that is pressed by a cassette holding spring member of the recording and/or reproducing system, the information detecting terminals have a predetermined elasticity, and the cassette holding spring member forms the cassette insertion and holding portion.

2. The recording and/or reproduction system according to claim 1, wherein predetermined elasticity of the information detecting terminals has a spring pressure of about 50 to 100 g.

3. A recording and/or reproduction system for a recording medium wherein a cassette accommodating a recording medium is inserted in a predetermined direction into a cassette insertion and holding portion, and after the insertion thereof, the recording medium is moved to a cassette mounting position for recording in and/or reproducing from the recording medium, wherein the cassette includes:
a storage element unit for storing a required information of the recording medium, and output terminals of the storage element unit exposed on an outer surface of the cassette;
information detection terminals for an information detecting unit corresponding to the output terminals of the storage element unit on the cassette side are arranged on an inner surface side of the cassette insertion and holding portion; and
the required information is read from the storage element unit before the cassette is moved to the cassette mounting position, wherein the cassette further includes connection windows corresponding to the information detection terminals and the storage element unit is fixed by a fixing means on the inner surface side of the cassette, wherein the output terminals face the connection windows from the inner surface side.

4. The recording and/or reproduction system according to claim 3, wherein the fixing means on the inner surface side of the cassette includes a recess for accommodating the storage element unit and engaging protrusions protruded from the peripheral edge of the recess, wherein connection windows corresponding to the detection detecting terminals are formed in the recess.

5. A recording and/or reproduction system for a recording medium wherein a cassette accommodating a recording medium is inserted in a predetermined direction into a cassette insertion and holding portion, and after the insertion thereof, the recording medium is moved to a cassette mounting position for recording in and/or reproducing from the recording medium, wherein the cassette includes:
a storage element unit for storing a required information of the recording medium, and output terminals of the storage element unit exposed on an outer surface of the cassette;
information detection terminals for an information detecting unit corresponding to the output terminals of the storage element unit on the cassette side are arranged on an inner surface side of the cassette insertion and holding portion; and
the required information is read from the storage element unit before the cassette is moved to the cassette mounting position, wherein the cassette further includes on the lower surface side thereof a slider adapted to slide in longitudinal directions for opening and closing an opening thereof, wherein the slider is formed with connection windows corresponding to the information detection terminals, the storage element unit is fixed by a fixing means on the inner surface of the slider, and the output terminals of the storage element unit face the connection windows from the inner surface side thereof.

6. The recording and/or reproduction system according to claim 5, wherein the fixing means on the inner surface side of the slider includes a recess for accommodating the storage element unit and engaging protrusions protruded from the peripheral edge portion of the recess, and the connection windows corresponding to the information detection terminals are formed on the recess.

* * * * *